(12) United States Patent
Evensen

(10) Patent No.: US 10,119,317 B2
(45) Date of Patent: Nov. 6, 2018

(54) PUMP HANDLE SYSTEM AND METHOD OF USE

(71) Applicant: Reflection Window Company, LLC, Chicago, IL (US)

(72) Inventor: Kenneth R. Evensen, Naperville, IL (US)

(73) Assignee: REFLECTION WINDOW COMPANY, LLC, Chicago, IL (US)

(*) Notice: Subject to any disclaimer, the term of this patent is extended or adjusted under 35 U.S.C. 154(b) by 461 days.

(21) Appl. No.: 14/860,371

(22) Filed: Sep. 21, 2015

(65) Prior Publication Data

US 2017/0081893 A1 Mar. 23, 2017

(51) Int. Cl.
| | | |
|---|---|---|
| *E05D 15/28* | (2006.01) |
| *E05F 11/10* | (2006.01) |
| *E05F 3/22* | (2006.01) |
| E05F 9/00 | (2006.01) |
| E05F 11/00 | (2006.01) |
| F16H 31/00 | (2006.01) |

(52) U.S. Cl.
CPC .............. *E05F 11/10* (2013.01); *E05F 3/22* (2013.01); *E05F 9/00* (2013.01); *E05F 11/00* (2013.01); *F16H 31/003* (2013.01)

(58) Field of Classification Search
CPC . E05F 11/10; E05F 11/00; E05F 11/02; E05F 3/22; E05F 9/00; F16H 31/003; E06B 7/04

USPC .................................. 49/275, 506, 246–253
See application file for complete search history.

(56) References Cited

U.S. PATENT DOCUMENTS

| | | | | |
|---|---|---|---|---|
| 2,576,536 A * | 11/1951 | Reynaud | ................. | E05F 11/14 49/342 |
| 4,898,408 A * | 2/1990 | Hauber | ............... | E05F 63/0069 292/21 |
| 8,141,295 B2 * | 3/2012 | Carrier | .................... | E05F 11/16 49/246 |
| 9,273,763 B2 * | 3/2016 | Evensen | ................. | F16H 21/44 |
| 9,772,010 B2 * | 9/2017 | Dodge | .................. | F16H 19/001 |
| 2013/0312331 A1 * | 11/2013 | Bourgoin | ............... | E05F 11/10 49/359 |

\* cited by examiner

*Primary Examiner* — Chi Q Nguyen
(74) *Attorney, Agent, or Firm* — McAndrews, Held & Malloy, Ltd.

(57) ABSTRACT

A pump handle system includes a pump handle and a main shaft. The pump handle is operable to radially pivot from a starting position in a first pivot direction and back to the starting position in a second pivot direction opposite the first pivot direction. The main shaft is driven by the pump handle to rotate approximately a first half of a predetermined rotational distance in a first rotational direction a first time the pump handle is pivoted out from the starting position in the first pivot direction, and rotate approximately a second half of the predetermined rotational distance in the first rotational direction a first time the pump handle is pivoted back to the starting position in the second pivot direction. The main shaft rotates in a second rotational direction opposite the first rotational direction a second time the pump handle is pivoted in the two-movement push-pull motion.

20 Claims, 18 Drawing Sheets

PUMP HANDLE SYSTEM AND METHOD OF USE

CROSS-REFERENCE TO RELATED APPLICATIONS/INCORPORATION BY REFERENCE

U.S. patent application Ser. No. 14/711,026, by Evensen, filed May 13, 2015, is incorporated by reference herein in its entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to a pump handle system and method of use for pivoting a main shaft that may interface with a mechanism to unlock/lock and/or open/close windows, doors, and the like without excessive force and twisting. More specifically, certain embodiments provide a pump handle mechanism configured to rotate a main shaft a predetermined distance, such as approximately one hundred and eighty (180) degrees, using a two-movement pull-push motion of the pump handle. A first two-movement pull-push motion may, for example, rotate the main shaft approximately one hundred and eighty (180) degrees in a first direction to unlock and/or open a window or door, and a second two-movement pull-push motion can rotate the main shaft approximately one hundred and eighty (180) degrees in a second direction opposite the first direction to close and/or lock the window or door. The force applied to a handle portion of the pump handle to pivot the main shaft for any operation need not exceed five (5) pounds (lbs.).

BACKGROUND OF THE INVENTION

The Americans with Disabilities Act (ADA), which affects many public and private commercial buildings, is intended to ensure equal access to all persons regardless of physical disabilities. Section 309.4 of the ADA accessibility guidelines related to window and door hardware sets forth that "[o]perable parts shall be operable with one hand and shall not require tight grasping, pinching, or twisting of the wrist. The force required to activate operable parts shall be 5 pounds (22.2 N) maximum." The Department of Justice Standards for Accessible Design (4.27.4) and the International Building Code (ANSI 309.4) set forth similar guidelines.

Architects prefer larger vents for exterior window designs to meet fresh air ventilation requirements. Using a larger quantity of smaller vents is typically more expensive than using a fewer quantity of larger vents. Additionally, current energy codes and specifications require low thermal insulating values for windows. Insulated glass has a better insulating value than metal, so the more metal used in a window system, the lower the insulating value. Because the exterior seal of a vent is subject to lower insulating values by nature and is a weak thermal point in the window system, a larger vent size helps to offset the overall insulating value due to the greater percentage of glass. A larger vent helps in the insulating performance but a larger vent takes more force to open.

Although using larger vents may improve insulating performance and decrease costs for architects, larger vents are typically more difficult to open and close. More specifically, an insulated glass unit weighs approximately seven (7) lbs. per square foot and can weigh as much as eight and one half (8.5) lbs. per square foot for insulated laminated glass. When aluminum and other materials are added to construct the vent frame and sash, a vent can weigh around nine (9) lbs. per square foot or more. As such, a four (4) foot by five (5) foot vent may weigh approximately one hundred and eighty-nine (189) lbs. or more, which may be difficult to open using not more than five (5) lbs. of operational force as required by applicable ADA and other guidelines.

In addition to generally being more difficult to open and close, larger vents are also typically more difficult to lock and unlock. Vents, like other window systems, are manufactured and installed to meet strict air and water performance specifications. As such, to compress a sash to a vent frame of the window system, a great deal of compressive force can be needed to make the system air and water tight. The compression of the sash to the vent frame is commonly achieved by the locking of the sash using the vent handle, which moves one or more transmission bars inside a eurogrove (or vent track) around the perimeter of the sash when the vent handle is rotated in one direction as described, for example, in U.S. patent application Ser. No. 14/711,026, by Evensen, filed May 13, 2015, which is incorporated by reference herein in its entirety.

Many current vent designs for exterior windows require in excess of five (5) lbs. of force to open/close a sash. For example, many current vent designs do not use any mechanisms to open/close a sash (e.g., push open and pull closed), which may require more than five (5) lbs. of force, particularly for larger vents. Further, current vent designs that do have mechanisms for opening/closing a sash may not alleviate the force necessary to open/close the sash to meet the ADA guidelines. Instead, some mechanisms, such as cranks, not only may require more force to open, but also require excessive twisting. Additionally, many current vent designs for exterior windows require in excess of five (5) lbs. of force to lock/unlock a sash, particularly for larger vents having locking mechanisms with more locking points. Also, many current vent designs that do have mechanisms for opening/closing a sash use different mechanisms to unlock/lock a sash.

Sections 308.2 and 309.3 of the ADA accessibility guidelines set forth that parts operated by a forward reach that is unobstructed shall be at a minimum fifteen (15) inches and at a maximum forty-eight (48) inches above the finish floor or ground. In situations where the vent handle is located at a side of the vent, as opposed to the bottom, for example, the operation point of existing vent designs may exceed the forty-eight (48) inch operational height requirement. For example, a sixty (60) inch tall vent may be mounted on a twenty-four (24) inch knee wall. The vent handle may be mounted at a side of the vent sash and preferably in the center such that an applied force is distributed evenly. Accordingly, in the above example, the preferable vent handle location would be fifty-four (54) inches above the finish floor, which would be above the maximum operational height requirement.

Moreover, some existing opening/closing and/or locking/unlocking systems may be ineffective or inoperable in confined spaces. For example, longer handles used on systems that pivot ninety (90) to one hundred eighty (180) degrees use a considerable amount of operational space that may interfere with or limit the use of space adjacent to the vent.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A pump handle system and method of use for pivoting a main shaft that may interface with a mechanism to unlock/lock and/or open/close windows, doors, and the like without excessive force and twisting is provided, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

Figure 1:
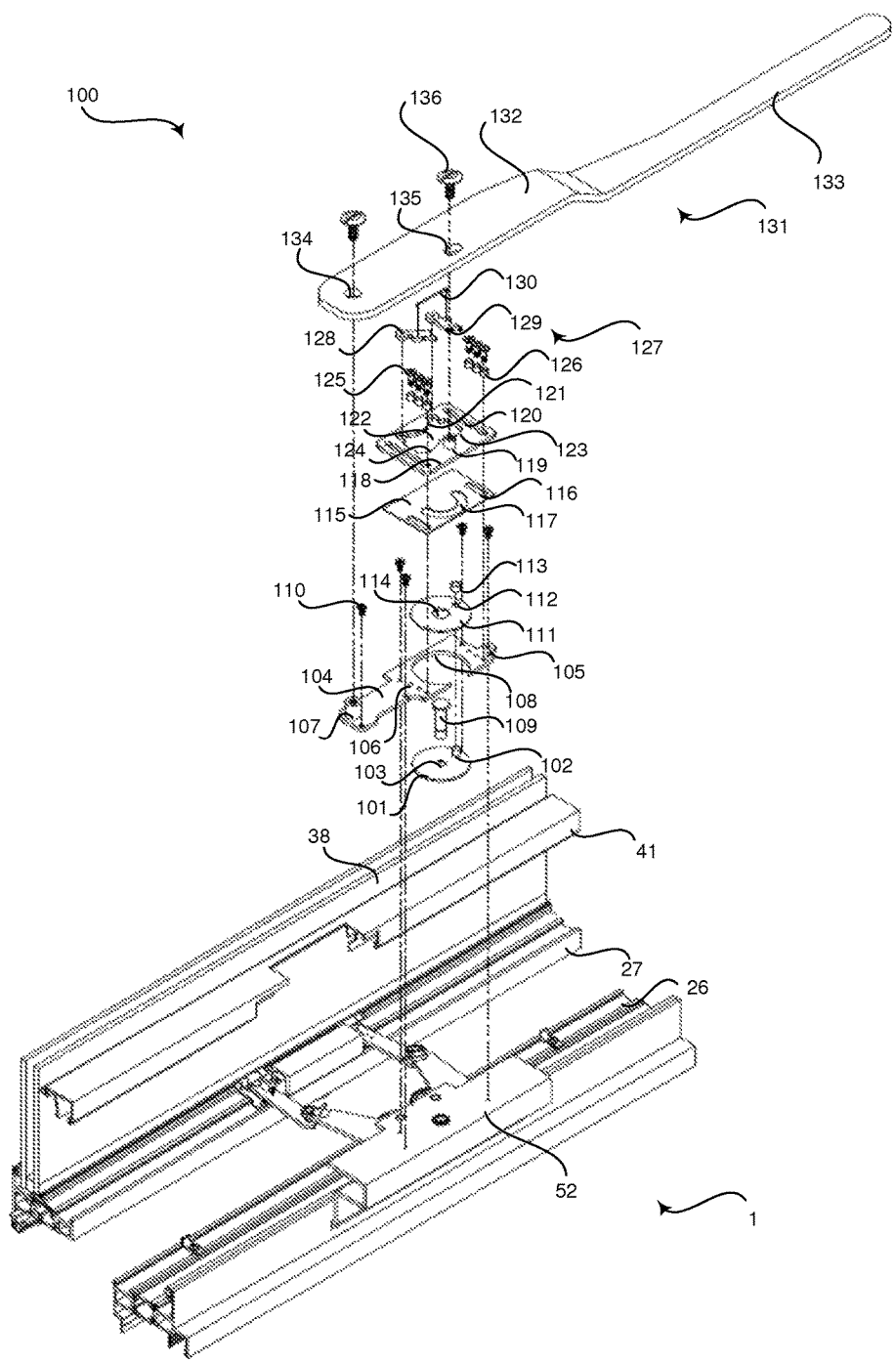
FIG. 1 is a diagram that illustrates an exploded perspective view of an exemplary pump handle system operable to connect with an exemplary opening-closing mechanism for a vent sash in accordance with an embodiment of the present invention.

The foregoing summary, as well as the following detailed description of certain embodiments of the present invention, may be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION

Certain embodiments of the invention may be found in a pump handle system 100 and method of use 200 for pivoting a main shaft 109 that may interface with a mechanism 1 to unlock/lock and/or open/close windows, doors, and the like without excessive force and twisting. More specifically, certain embodiments provide a pump handle system 100 configured to rotate a main shaft 109 a predetermined distance, such as approximately one hundred and eighty (180) degrees, using a two-movement pull-push motion of a pump handle 131. A first two-movement pull-push motion of the pump handle 131 may, for example, rotate the main shaft 109 approximately one hundred and eighty (180) degrees in a first direction to unlock and/or open a window or door, and a second two-movement pull-push motion of the pump handle 131 can rotate the main shaft 109 approximately one hundred and eighty (180) degrees in a second direction opposite the first direction to close and/or lock the window or door. The force applied to the handle portion 133 of the pump handle 131 to pivot the main shaft 109 for any operation need not exceed five (5) pounds (lbs.).

Various embodiments provide a pump handle system 100 comprising a pump handle 131 and a main shaft 109. The pump handle 131 comprises a base portion 132 and a handle portion 133. The pump handle 131 is operable to radially pivot at a pivot point 134 in the base portion 132 from a starting position in a first pivot direction and back to the starting position in a second pivot direction opposite the first pivot direction. The main shaft 109 is driven by the pump handle 131 to (1) rotate approximately a first half of a predetermined rotational distance in a first rotational direction a first time the pump handle 131 is pivoted out from the starting position in the first pivot direction, (2) rotate approximately a second half of the predetermined rotational distance in the first rotational direction a first time the pump handle 131 is pivoted back to the starting position in the second pivot direction, (3) rotate approximately the first half of the predetermined rotational distance in a second rotational direction opposite the first rotational direction a second time the pump handle 131 is pivoted out from the starting position in the first pivot direction, and (4) rotate approximately the second half of the predetermined rotational distance in the second rotational direction a second time the pump handle 131 is pivoted back to the starting position in the second pivot direction.

As used herein, the terms "exemplary" or "example" means serving as a non-limiting example, instance, or illustration. As used herein, the term "e.g." introduces a list of one or more non-limiting examples, instances, or illustrations.

As used herein, an element recited in the singular and proceeded with the word "a" or "an" should be understood as not excluding plural of the elements, unless such exclusion is explicitly stated. Furthermore, references to "an embodiment," "one embodiment," "a representative embodiment," "an exemplary embodiment," "various embodiments," "certain embodiments," and the like are not intended to be interpreted as excluding the existence of additional embodiments that also incorporate the recited features. Moreover, unless explicitly stated to the contrary, embodiments "comprising," "including," or "having" an element or a plurality of elements having a particular property may include additional elements not having that property.

Although certain embodiments in the foregoing description may be described in reference to casement vents, unless so claimed, the scope of various aspects of the present invention should not be limited to casement vents and may additionally and/or alternatively be applicable to awning vents, hopper vents, or any suitable vent. Further, although the viewpoint of FIGS. 1-17 may appear as though the pump handle system 100 is connected to an opening-closing mechanism 1 attached at a base of a window frame 26 and vent sash 27, the scope of various aspects of the present invention should not be limited to the viewpoint of the pump handle system 100 and/or opening-closing mechanism 1 being positioned at a base of a window frame 26 and vent sash 27 and may additionally and/or alternatively be a viewpoint of the pump handle system 100 and/or opening-closing mechanism 1 being positioned at any side and position along the perimeter of the window frame 26 and vent sash 27.

Additionally, although certain embodiments in the foregoing description may describe the pump handle system 100 as interacting with an opening-closing mechanism 1 as described in U.S. patent application Ser. No. 14/711,026, by Evensen, filed May 13, 2015, which is incorporated by reference herein in its entirety, for example, unless so claimed, the scope of various aspects of the present invention should not be limited to a particular opening-closing mechanism 1 and may additionally and/or alternatively be applicable to any suitable opening-closing mechanism 1.

Moreover, although certain embodiments in the foregoing description may describe the pump handle system 100 operable to open and close a vent sash 27, unless so claimed, the scope of various aspects of the present invention should not be limited to windows and may additionally and/or alternatively be applicable to doors or any suitable device driven by rotation of a main shaft 109.

FIG. 1 is a diagram that illustrates an exploded perspective view of an exemplary pump handle system 100 operable to connect with an exemplary opening-closing mechanism 1 for a vent sash 27 in accordance with an embodiment of the present invention. Referring to FIG. 1, the pump handle system 100 comprises a main shaft 109, drive 101 and guide 111 disks, a main frame 104, a sliding plate 118, and a handle 131. The main shaft 109 extends through a center main shaft hole 103 in a drive disk 101. The main shaft 109 may interface with, for example, an opening-closing mechanism 1 having a frame 52 that attaches to a window frame 26. In various embodiments, the opening-closing mechanism 1 may be operable to unlock, open, close, and lock a vent sash 27 having glass 38 or other infill held in place by glazing bead 41. For example, the opening-closing mechanism 1 may be the lever mechanism described in U.S. patent application Ser. No. 14/711,026, by Evensen, filed May 13, 2015, which is incorporated by reference herein in its entirety, or any suitable device driven by rotation of the main shaft 109.

The main shaft 109 is operable to rotate a predetermined distance in a first rotational direction and a second rotation direction opposite the first rotational direction. For example, the main shaft 109 can be driven approximately one hundred and eighty (180) degrees in a first rotational direction to unlock and open a vent sash 27 and may be driven approximately one hundred and eighty (180) degrees in a second rotational direction opposite the first rotational direction to close and lock the vent sash 27. The predetermined distance can be dependent on the amount of rotation of the main shaft 109 needed to fully open and close a window, door, or the like.

The drive disk 101 is a freely-rotating round disk having a centrally-located main shaft hole 103 and a pin 102 extending from the drive disk 101 near a perimeter of the drive disk 101. The center main shaft hole 103 is sized to receive the main shaft 109. The pin 102 is fixably attached to or integrated with the drive disk 101 and extends through a hole 112 in a guide disk 111 as described below.

The main frame 104 comprises mounting holes 105, sliding plate mounting holes 106, a standoff 107, and a drive disk opening 108. The main frame 104 may be mounted to a frame 52 of the opening-closing mechanism 1 by mounting screws 110 that extend through the mounting holes 105 of the main frame 104. The sliding plate 118 may be slidably mounted to the main frame by shoulder screws 125 having sleeve rollers 126, the shoulder screws 125 attaching to the sliding plate mounting holes 106 of the main frame 104 as described below. The standoff 107 can extend into a pivot hole 134 at an end of the base portion 132 of a handle 131. The standoff 107 may receive a head screw 136 to pivotably attach the handle 131 to the main frame 104. The drive disk 101 rotatably fits within the drive disk opening 108 of the main frame 104.

The guide disk 111 is a round disk having a centrally-located main shaft head hole 114 and a drive disk pin hole 112 near a perimeter of the guide disk 111. The center main shaft head hole 114 is shaped to fit over the head of the main shaft 109 such that the guide disk 111 rotates in unison with the main shaft 109. The pin 102 of the drive disk 101 extends through the drive disk pin hole 112 such that the rotation of the drive disk 101 drives the guide disk 111 and main shaft 109. A roller 113 may fit over pin 102 and be operable to reduce friction between the pin 102 and the guide disk hole 112. The roller 113 can also reduce friction between the pin 102 and flippers 127 or the guide edges 123, 124 of the sliding plate 118 as described below. Although the drive 101 and guide 111 disks are shown as separate components in FIG. 1, in various embodiments, the drive 101 and guide 111 disks may be integrated in various forms.

The sliding plate 118 comprises a standoff 119, slotted rails 120, and flippers 127. The sliding plate 118 is driven by the pump handle 131 to drive the pin 102 of the drive disk 101, which drives the guide disk 111 and main shaft 109. The standoff 119 can extend into a slotted hole 134 generally located at a center section of the base portion 132 of the handle 131. The slotted hole 135 of the handle 131 allows the standoff 119 to slide within the slot 135 as the handle 131 is pivoted out from the starting position and pivoted back to the starting position. For example, the handle 131 is pivoted in an arc in a first plane while the sliding plate 118 slides linearly in a second plane parallel to the first plane. The slotted hole 135 allows the linear movement of the sliding plate 118 as the handle 131 is pivoted in an arc. The standoff 119 may receive a head screw 136 to slidably attach the sliding plate 118 to the handle 131.

The sliding plate 118 is slidably attached to the main frame 104 by shoulder screws 125 that extend through the slotted rails 120 at two opposite ends of the sliding plate 118 and into the sliding plate shoulder screw mounting holes 106 of the main frame 104. The shoulder screws 125 may include sleeve rollers 126 for reducing friction between the sliding plate 118 and the shoulder screws 125. Although shoulder screws 125 and sleeve rollers 126 are shown in FIG. 1 and described above, in various embodiments, molded parts, tabs, or the like can be used in place of the shoulder screws 125 and sleeve rollers 126 to slidably attach the sliding plate 118 to the main frame 104. The slotted rails 120 provided at two opposite ends of the sliding plate 118 align the sliding plate 118 with the main frame 104 and guide and/or otherwise restrict the sliding movement of the sliding plate 118 to be substantially linear and generally perpendicular to the window, door, or the like.

In various embodiments, a spacer 115, which may be nylon or any suitable material, can be positioned between the sliding plate 118 and the guide disk 111 to reduce friction between the sliding plate 118 and the guide disk 111 and main frame 104. The nylon spacer 115 includes rail 115 and pin 117 openings. The rail openings 115 correspond with the slotted rails 120 of the sliding plate 118 so that the nylon spacer 115 does not interfere with the shoulder screws 125 and sleeve rollers 126 or other suitable slidable connection mechanism. The pin opening 117 corresponds with a path of the pin 102 that extends into the flipper guide opening 122 of the sliding plate 118 as described below. The pin opening 117 allows for uninhibited movement of the pin 102 as it rotates within the sliding plate 118.

Still referring to FIG. 1, the flippers 127 pivot within flipper pivot point slots 121 and a flipper guide opening 122 of the sliding plate 118 as the handle 131 is pivoted, the sliding plate 118 slides, and one of the flippers 127 drives and/or follows the pin 102. The flippers 127 each comprise a flipper pivot point 128 and a flipper extension 129. The flipper pivot point 128 of each flipper 127 rotatably fits within a corresponding pivot point slot 121. The flipper extension 129 of each flipper 127 extends from the flipper pivot point 128 and into the guide opening 122 of the sliding plate 118. The flippers 127 are connected at the flipper extensions 129 by a flipper arm 130 to pivot the flippers 127 in unison as the handle 131 is pulled out from a starting position or pushed back to the starting position. The flipper guide opening 122 comprises a first flipper guide edge 123 and a second flipper guide edge 124. The guide edges 123, 124 may be arced edges of the guide opening 122 that correspond with each of the flipper extensions 129 that pivot within the guide opening 122 as described below.

The pump handle 131 comprises a base portion 132 and a handle portion 133. The handle portion 133 can include a grip or textured surface to assist a user in gripping the handle portion 133. The handle portion 133 may be telescopic and/or otherwise collapsible, foldable, or the like. In various embodiments and as discussed in more detail below, the handle portion 133 may be grasped and rotated or pivoted to unlock and open, or close and lock, a vent sash 27, door, or the like. The force required to pivot the pump handle 131 for any operation does not exceed five (5) pounds (lbs.).

The base portion 132 of the pump handle 131 includes a pivot hole 134 at one end and connects to the handle portion 133 at the other end. The pivot hole 134 receives a standoff 107 of the main frame 104 and may be secured by a head screw 136 or any suitable connection mechanism to allow the handle 131 to pivotably attach to the main frame 104. The base portion 132 may further comprise a slotted hole 135 generally located in a central region of the base between the pivot hole 134 and the end of the base portion 132 that connects to the handle portion 133. The slotted hole 135 receives a standoff 119 of the sliding plate 118 and can be secured by a head screw 136 or any suitable connection mechanism to allow the handle to slidably attach to the sliding plate 118. The slotted hole 135 of the handle 131 allows the standoff 119 to slide within the slot 135 as the handle 131 is pivoted out along a curved path from the starting position and pivoted back to the starting position. For example, the handle 131 is pivoted in a curved path while the sliding plate 118 slides linearly below the handle 131. The slotted hole 135 allows the linear movement of the sliding plate 118 as the handle 131 is pivoted along the curved path.

In various embodiments, the pump handle 131 is operated in a two-movement pull-push motion to rotate a main shaft 109 a predetermined distance, such as approximately one hundred and eighty (180) degrees. A first two-movement pull-push motion of the pump handle 131 may, for example, rotate the main shaft 109 approximately one hundred and eighty (180) degrees in a first direction to unlock and/or open a window or door, and a second two-movement pull-push motion of the pump handle 131 can rotate the main shaft 109 approximately one hundred and eighty (180) degrees in a second direction opposite the first direction to close and/or lock the window or door. The force applied to the handle portion 133 of the pump handle 131 to pivot the main shaft 109 for any operation need not exceed five (5) pounds (lbs.).

The first pull movement of the pump handle 131 from a starting position and away from the vent sash 27 may force the sliding plate 118 to slide linearly in a first direction that is away from the vent sash 27. As the sliding plate 118 is driven in the first direction, the sliding plate 118 forces a first flipper 127 to drive and follow pin 102 of the drive disk 101. The drive disk 101, guide disk 111, and main shaft 109 rotate in unison as the flipper 127 drives the pin 102. The first pull movement may drive the pin approximately half (e.g., 85-105 degrees) of the predetermined distance (e.g., 180 degrees) in a first rotational direction. In various embodiments, the first pull movement causes the first flipper 127 to drive the pin 102 just beyond the point in the flipper guide opening 122 where the first flipper guide edge 123 meets the second flipper guide edge 124. In certain embodiments, the rotation of the main shaft 109 caused by the first pull movement may, for example, drive the opening-closing mechanism 1 to unlock and/or begin opening the vent sash 27, a door, or any suitable device.

The first push movement of the pump handle 131 back to the starting position and toward the vent sash 27 may force the sliding plate 118 to slide linearly in a second direction, opposite the first direction, that is toward the vent sash 27. As the sliding plate 118 is driven in the second direction, the second flipper guide edge 124 of the sliding plate 118 drives the pin 102 of the drive disk 101 in the first rotational direction for the remaining approximately half (e.g., 75-95 degrees) of the predetermined distance (e.g., 180 degrees). The flippers 127 may follow the pin 102 as it is driven in the first rotational direction. The drive disk 101, guide disk 111, and main shaft 109 rotate in unison in the first rotational direction as the second flipper guide edge 124 drives the pin 102. In certain embodiments, the rotation of the main shaft 109 caused by the first push movement may, for example, drive the opening-closing mechanism 1 to fully open the vent sash 27, a door, or any suitable device.

The second pull movement of the pump handle 131 from the starting position and away from the vent sash 27 may force the sliding plate 118 to slide linearly in the first direction that is away from the vent sash 27. As the sliding plate 118 is driven in the first direction, the sliding plate 118 forces a second flipper 127 to drive and follow the pin 102 of the drive disk 101. The drive disk 101, guide disk 111, and main shaft 109 rotate in unison as the flipper 127 drives the pin 102. The rotation of the drive disk 101, guide disk 11, and main shaft 109 is in a second rotational direction that is opposite the first rotational direction of the first pull-push movement used to unlock and/or open the vent sash 27. The second pull movement may drive the pin approximately half (e.g., 85-105 degrees) of the predetermined distance (e.g., 180 degrees) in the second rotational direction. In various embodiments, the second pull movement causes the second flipper 127 to drive the pin 102 just beyond the point in the flipper guide opening 122 where the second flipper guide edge 124 meets the first flipper guide edge 123. In certain embodiments, the rotation of the main shaft 109 caused by the second pull movement may, for example, drive the opening-closing mechanism 1 to begin closing the vent sash 27, a door, or any suitable device.

The second push movement of the pump handle 131 back to the starting position and toward the vent sash 27 may force the sliding plate 118 to slide linearly in the second direction, opposite the first direction, that is toward the vent sash 27. As the sliding plate 118 is driven in the second direction, the second flipper guide edge 124 of the sliding plate 118 drives the pin 102 of the drive disk 101 in the second rotational direction for the remaining approximately half (e.g., 75-95 degrees) of the predetermined distance (e.g., 180 degrees). The flippers 127 may follow the pin 102 as it is driven in the second rotational direction. The drive disk 101, guide disk 111, and main shaft 109 rotate in unison in the second rotational direction as the first flipper guide edge 123 drives the pin 102. In certain embodiments, the rotation of the main shaft 109 caused by the second push movement may, for example, drive the opening-closing mechanism 1 to fully close and/or lock the vent sash 27, a door, or any suitable device.

In various embodiments, the pump handle 131 may be pivoted approximately fifteen (15) degrees (i.e., 5-30 degrees) for each full pull and push movement. Accordingly, the pump handle 131 reduces the amount of operational space needed to unlock, open, close, and lock a vent sash 27 such that the pump handle 131 can be operated in confined spaces. Moreover, the limited amount of space needed to operate the pump handle 131 allows the length of the pump handle 131 to be extended to reduce the amount of force needed to operate the pump handle 131 and to ensure that the operating point of the pump handle meets the height requirements of the ADA accessibility guidelines.

Figure 2:
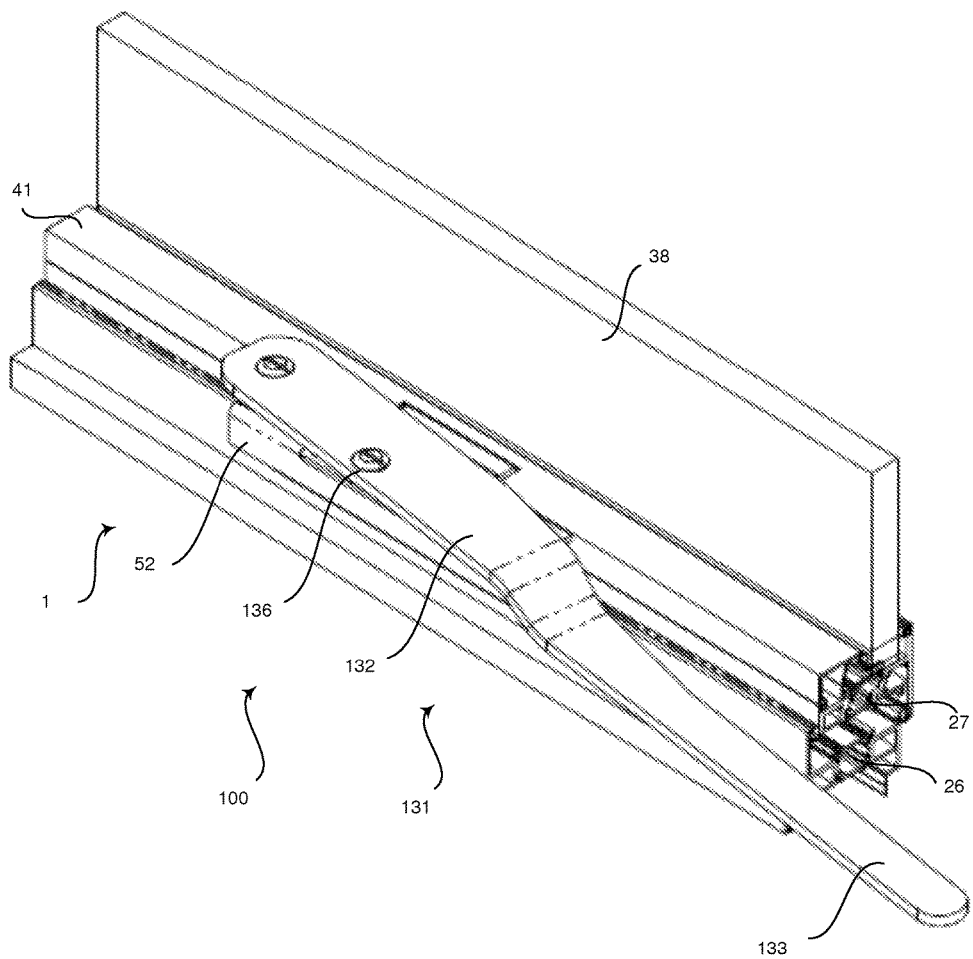
FIG. 2 is a diagram that illustrates a front perspective view of an exemplary pump handle system connected to an exemplary opening-closing mechanism for a vent sash, the exemplary pump handle system having a handle that is pivoting out from a starting position to open the vent sash in accordance with an embodiment of the present invention.
Figure 6:
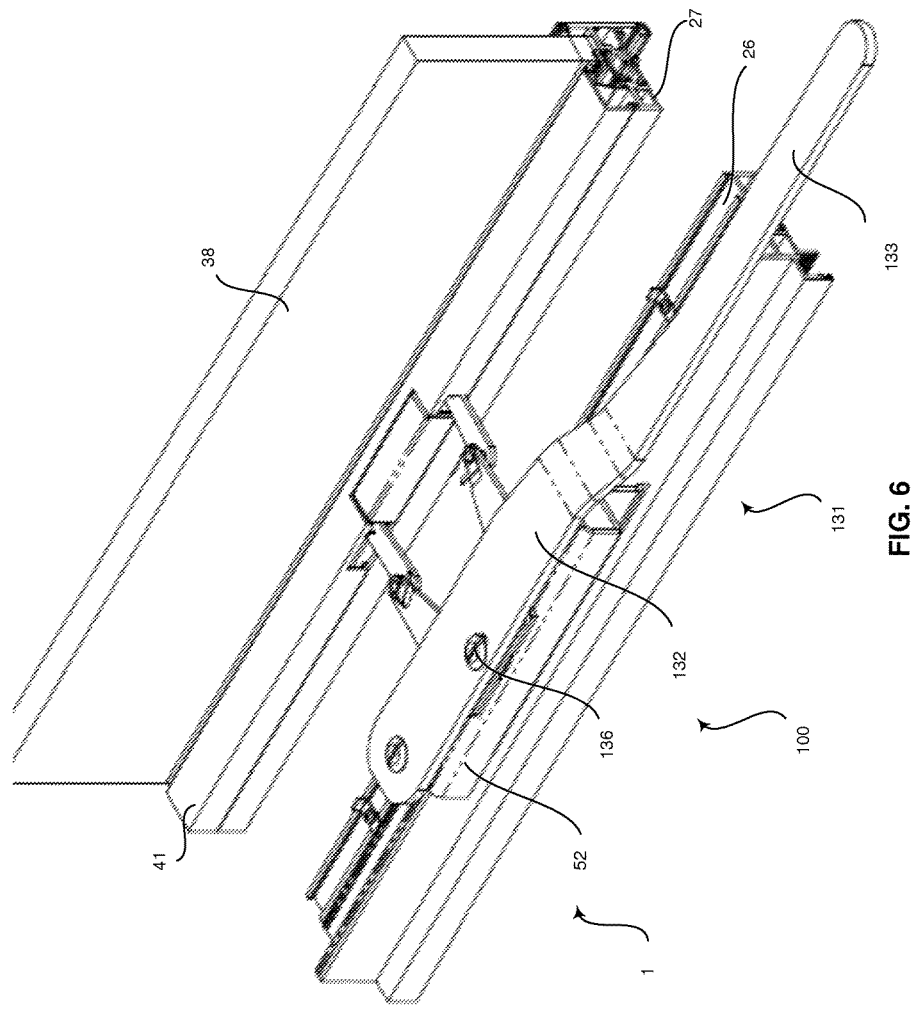
FIG. 6 is a diagram that illustrates a front perspective view of an exemplary pump handle system connected to an exemplary opening-closing mechanism for a vent sash, the exemplary pump handle system having a handle pivoted back to a starting position to fully open the vent sash in accordance with an embodiment of the present invention.
Figure 10:
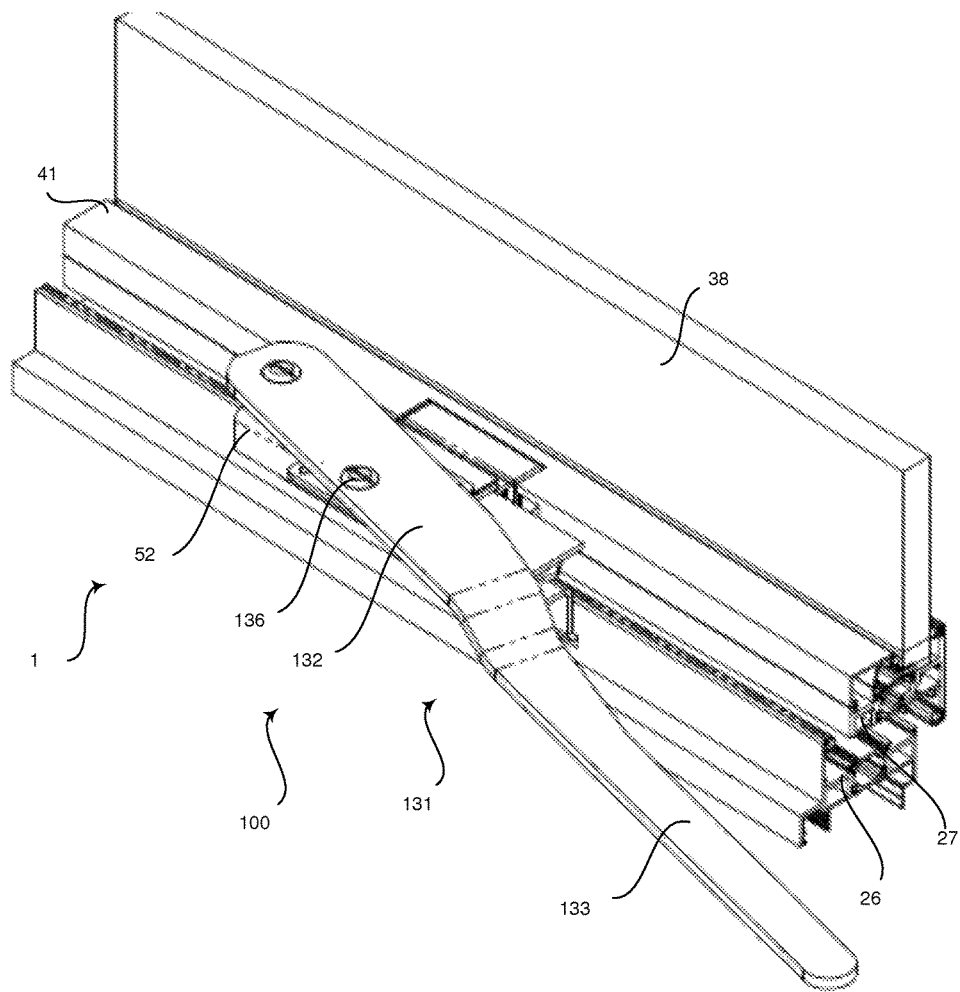
FIG. 10 is a diagram that illustrates a front perspective view of an exemplary pump handle system connected to an exemplary opening-closing mechanism for a vent sash, the exemplary pump handle system having a handle that is pivoting out from a starting position to close the vent sash in accordance with an embodiment of the present invention.
Figure 14:
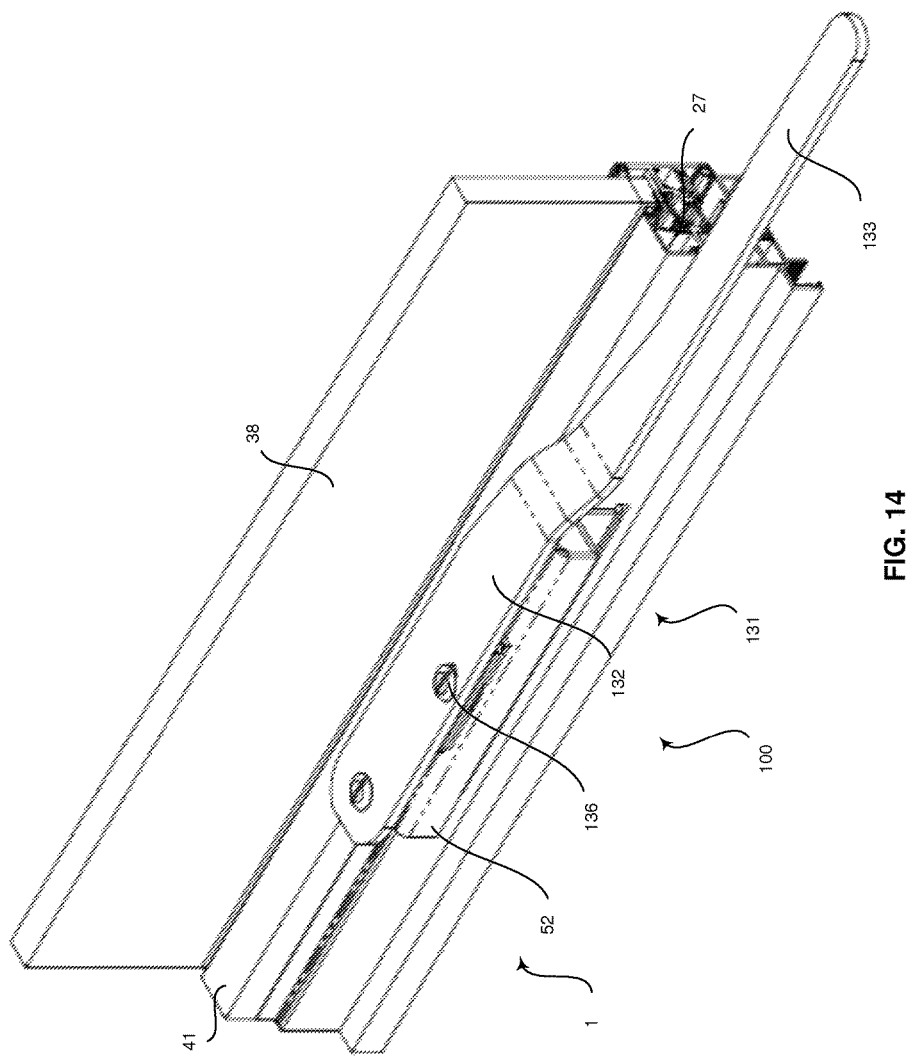
FIG. 14 is a diagram that illustrates a front perspective view of an exemplary pump handle system connected to an exemplary opening-closing mechanism for a vent sash, the exemplary pump handle system having a handle pivoted back to a starting position to fully close the vent sash in accordance with an embodiment of the present invention.

FIG. 2 is a diagram that illustrates a front perspective view of an exemplary pump handle system 100 connected to an exemplary opening-closing mechanism 1 for a vent sash 27, the exemplary pump handle system 100 having a handle 131 that is pivoting out from a starting position to open the vent sash 27. FIG. 6 is a diagram that illustrates a front perspective view of an exemplary pump handle system 100 connected to an exemplary opening-closing mechanism 1 for a vent sash 27, the exemplary pump handle system 100 having a handle 131 pivoted back to a starting position to fully open the vent sash 27. FIG. 10 is a diagram that illustrates a front perspective view of an exemplary pump handle system 100 connected to an exemplary opening-closing mechanism 1 for a vent sash 27, the exemplary pump handle system 100 having a handle 131 that is pivoting out from a starting position to close the vent sash 27. FIG. 14 is a diagram that illustrates a front perspective view of an exemplary pump handle system 100 connected to an exemplary opening-closing mechanism 1 for a vent sash 27, the exemplary pump handle system 100 having a handle 131 pivoted back to a starting position to fully close the vent sash 27.

Referring to FIGS. 2, 6, 10, and 14, there is shown a pump handle system 100, an opening-closing mechanism 1, a window frame 26, and a vent sash 27. The vent sash 27 comprises infill 38 and glazing beading 41. The infill 38 may be glass, aluminum, stone, wood, or any suitable material. The infill 38 may be held in place by glazing beading 41. The opening-closing mechanism 1 is operable to open and close the vent sash 27 and comprises a frame 52 mounted to a window frame 26. The frame 52 houses and protects components of the opening-closing mechanism 1 while providing an aesthetically-pleasing clean finish. The pump handle system 100 is connected to the opening-closing mechanism 1 and comprises a pump handle 131 having a base portion 132 and a handle portion 133. The pump handle 131 may be pivotably attached to a main frame 104 of the pump handle system 100 and slidably attached to a sliding plate 118 of the pump handle system 100 by head screws 136, for example.

As illustrated in FIG. 2, the pump handle 131 is beginning to pivot out from a starting position (i.e., first pull movement) to unlock and/or open the vent sash 27. As illustrated in FIG. 6, the pump handle 131 is pivoted back to a starting position (i.e., first push movement) to fully open the vent sash 27. As illustrated in FIG. 10, the pump handle 131 is beginning to pivot out from a starting position (i.e., second pull movement) to close the vent sash 27. As illustrated in FIG. 14, the pump handle 131 is pivoted back to the starting position (i.e., second push movement) to fully close the vent sash 27. The pump handle system 100 illustrated in FIGS. 2, 6, 10, and 14 shares various characteristics with the pump handle system 100 illustrated in FIG. 1 as described above.

Figure 3:
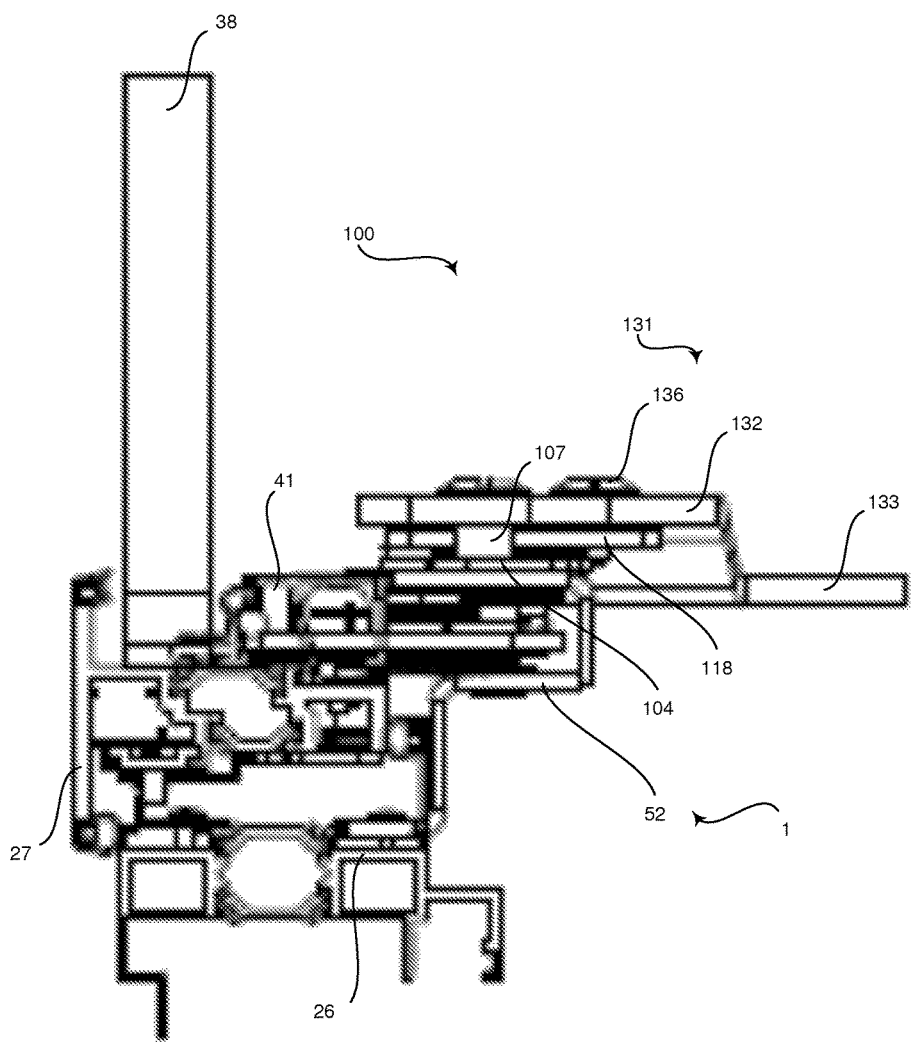
FIG. 3 is a diagram that illustrates a side view of an exemplary pump handle system connected to an exemplary opening-closing mechanism for a vent sash, the exemplary pump handle system having a handle that is pivoting out from a starting position to open the vent sash in accordance with an embodiment of the present invention.
Figure 7:
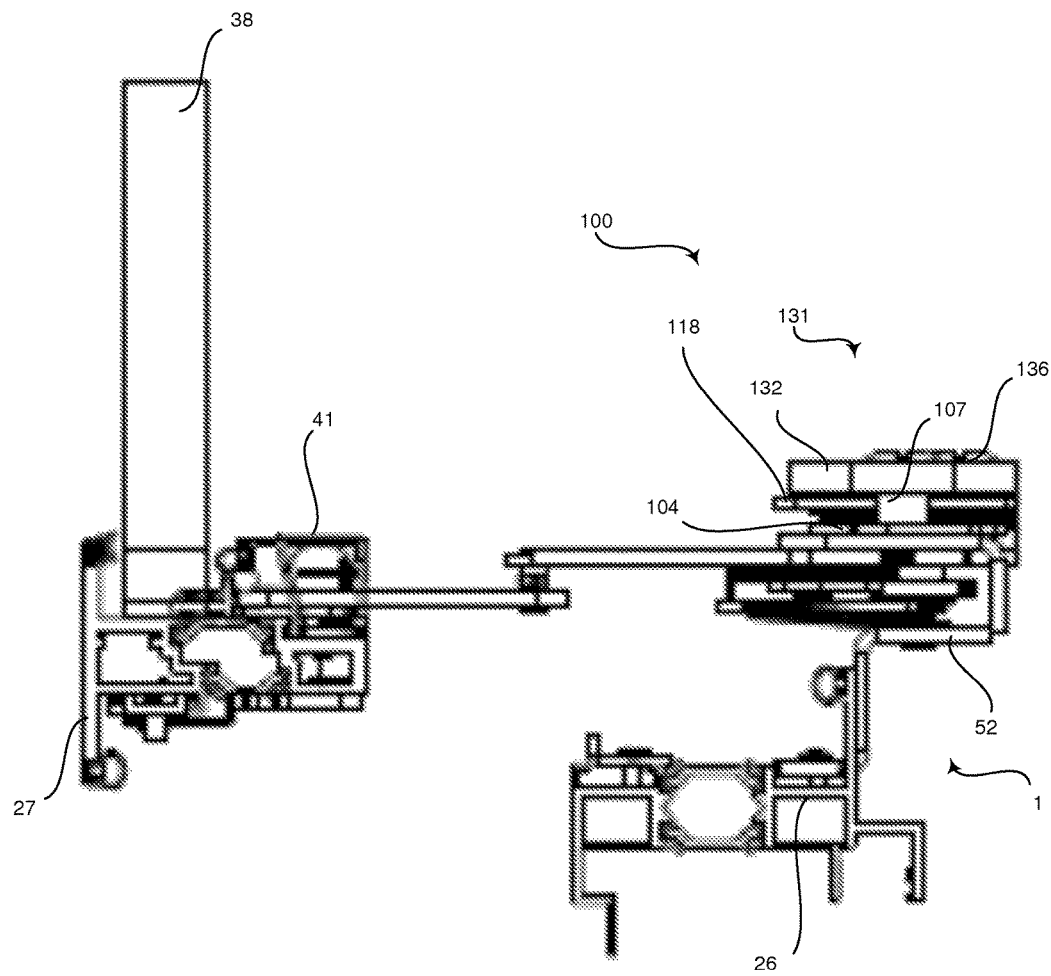
FIG. 7 is a diagram that illustrates a side view of an exemplary pump handle system connected to an exemplary opening-closing mechanism for a vent sash, the exemplary pump handle system having a handle pivoted back to a starting position to fully open the vent sash in accordance with an embodiment of the present invention.
Figure 11:
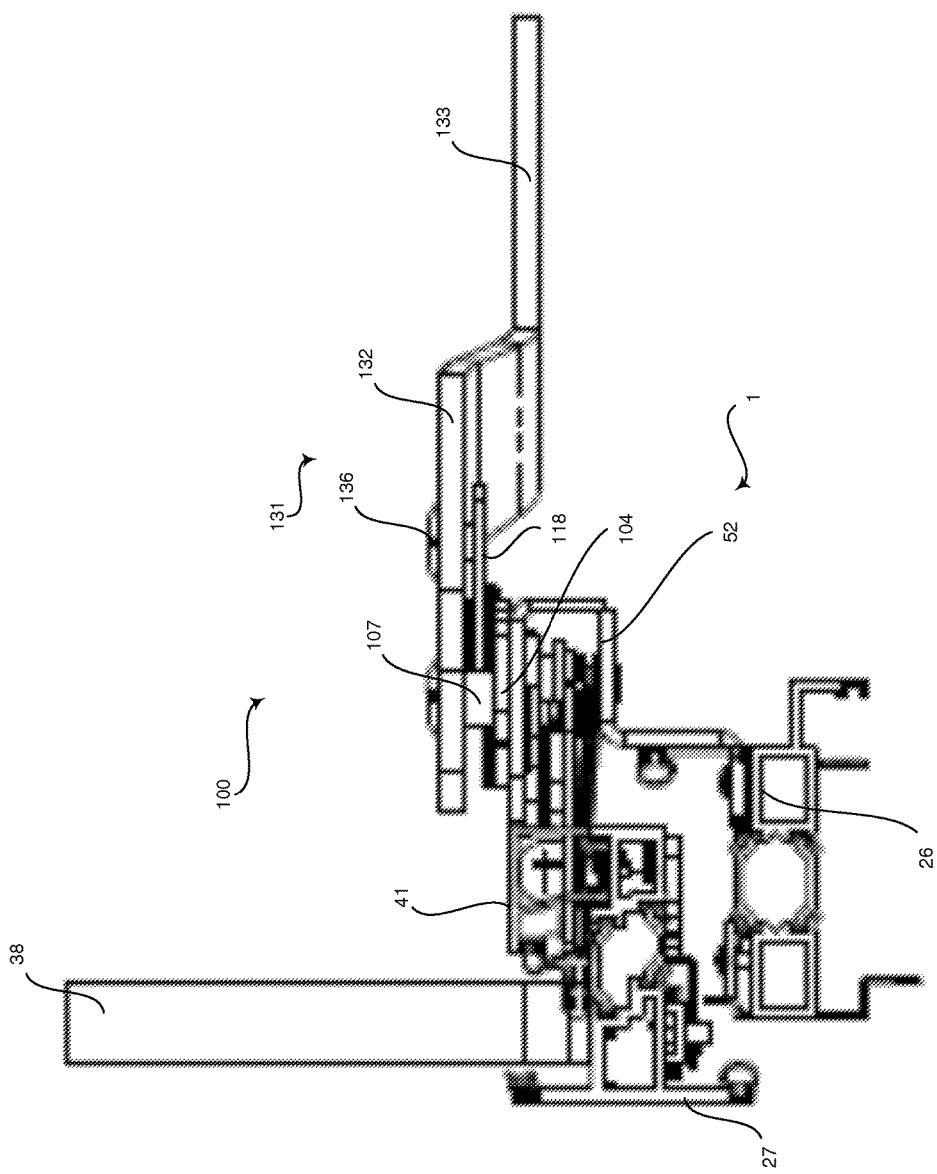
FIG. 11 is a diagram that illustrates a side view of an exemplary pump handle system connected to an exemplary opening-closing mechanism for a vent sash, the exemplary pump handle system having a handle that is pivoting out from a starting position to close the vent sash in accordance with an embodiment of the present invention.
Figure 15:
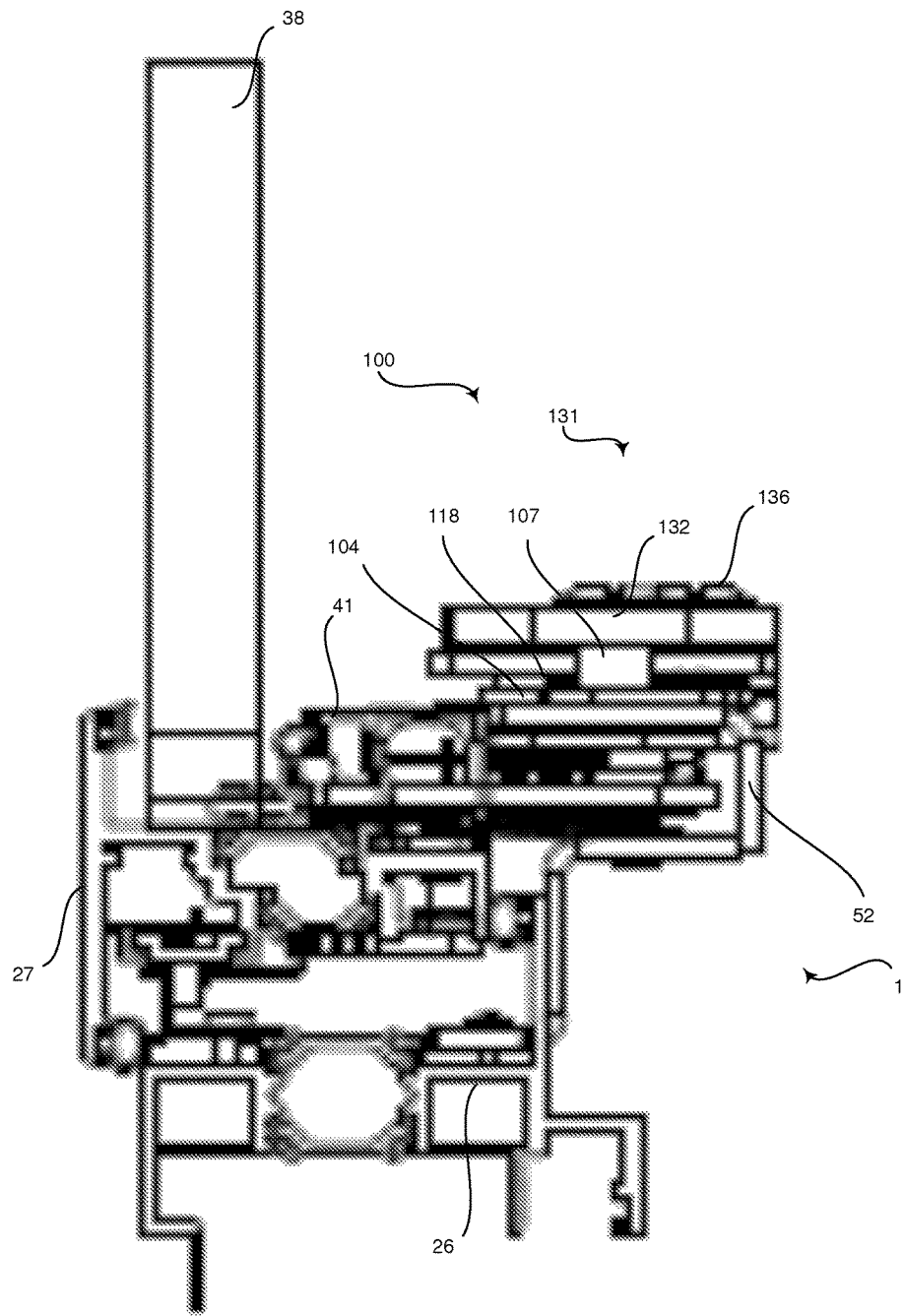
FIG. 15 is a diagram that illustrates a side view of an exemplary pump handle system connected to an exemplary opening-closing mechanism for a vent sash, the exemplary pump handle system having a handle pivoted back to a starting position to fully close the vent sash in accordance with an embodiment of the present invention.

FIG. 3 is a diagram that illustrates a side view of an exemplary pump handle system 100 connected to an exemplary opening-closing mechanism 1 for a vent sash 27, the exemplary pump handle system 100 having a handle 131 that is pivoting out from a starting position to open the vent sash 27 in accordance with an embodiment of the present invention. FIG. 7 is a diagram that illustrates a side view of an exemplary pump handle system 100 connected to an exemplary opening-closing mechanism 1 for a vent sash 27, the exemplary pump handle system 100 having a handle 131 pivoted back to a starting position to fully open the vent sash 27. FIG. 11 is a diagram that illustrates a side view of an exemplary pump handle system 100 connected to an exemplary opening-closing mechanism 1 for a vent sash 27, the exemplary pump handle system 100 having a handle 131 that is pivoting out from a starting position to close the vent sash 27. FIG. 15 is a diagram that illustrates a side view of an exemplary pump handle system 100 connected to an exemplary opening-closing mechanism 1 for a vent sash 27, the exemplary pump handle system 100 having a handle 131 pivoted back to a starting position to fully close the vent sash 27.

Referring to FIGS. 3, 7, 11, and 15, there is shown a pump handle system 100, an opening-closing mechanism 1, a window frame 26, and a vent sash 27. The vent sash 27 comprises infill 38 and glazing beading 41. The infill 38 may be glass, aluminum, stone, wood, or any suitable material. The infill 38 may be held in place by glazing beading 41. The opening-closing mechanism 1 is operable to open and close the vent sash 27 and comprises a frame 52 mounted to a window frame 26. The frame 52 houses and protects components of the opening-closing mechanism 1 while providing an aesthetically-pleasing clean finish.

Still referring to FIGS. 3, 7, 11, and 15, the pump handle system 100 is connected to the opening-closing mechanism 1 and comprises a pump handle 131, a main frame 104, and a sliding plate 118. The pump handle 131 comprises a base portion 132 and a handle portion 133. The handle portion 133 can include a grip or textured surface to assist a user in gripping the handle portion 133. The handle portion 133 may be telescopic and/or otherwise collapsible, foldable, or the like. The base portion 132 of the pump handle 131 can be pivotably connected to the main frame 104, such as by a standoff 107 of the main frame 104 coupling with a head screw 136 or any suitable connection mechanism. The base portion 132 of the pump handle 131 may be slidably connected to the sliding plate 118 with a head screw 136 or any suitable connection mechanism.

As illustrated in FIG. 3, the pump handle 131 is beginning to pivot out from a starting position (i.e., first pull movement) to unlock and/or open the vent sash 27. The first pull movement of the pump handle 131 from a starting position and away from the vent sash 27 forces the sliding plate 118 to slide linearly in a first direction that is away from the vent sash 27. As illustrated in FIG. 7, the pump handle 131 is pivoted back to a starting position (i.e., first push movement) to fully open the vent sash 27. The first push movement of the pump handle 131 back to the starting position and toward the vent sash 27 forces the sliding plate 118 to slide linearly in a second direction, opposite the first direction, that is toward the vent sash 27. As illustrated in FIG. 11, the pump handle 131 is beginning to pivot out from a starting position (i.e., second pull movement) to close the vent sash 27. The second pull movement of the pump handle 131 from the starting position and away from the vent sash 27 forces the sliding plate 118 to slide linearly in the first direction that is away from the vent sash 27. As illustrated in FIG. 15, the pump handle 131 is pivoted back to the starting position (i.e., second push movement) to fully close the vent sash 27. The second push movement of the pump handle 131 back to the starting position and toward the vent sash 27 forces the sliding plate 118 to slide linearly in the second direction, opposite the first direction, that is toward the vent sash 27. The pump handle system 100 illustrated in FIGS. 3, 7, 11, and 15 shares various characteristics with the pump handle system 100 illustrated in FIGS. 1-2, 6, 10, and 14 as described above.

Figure 4:
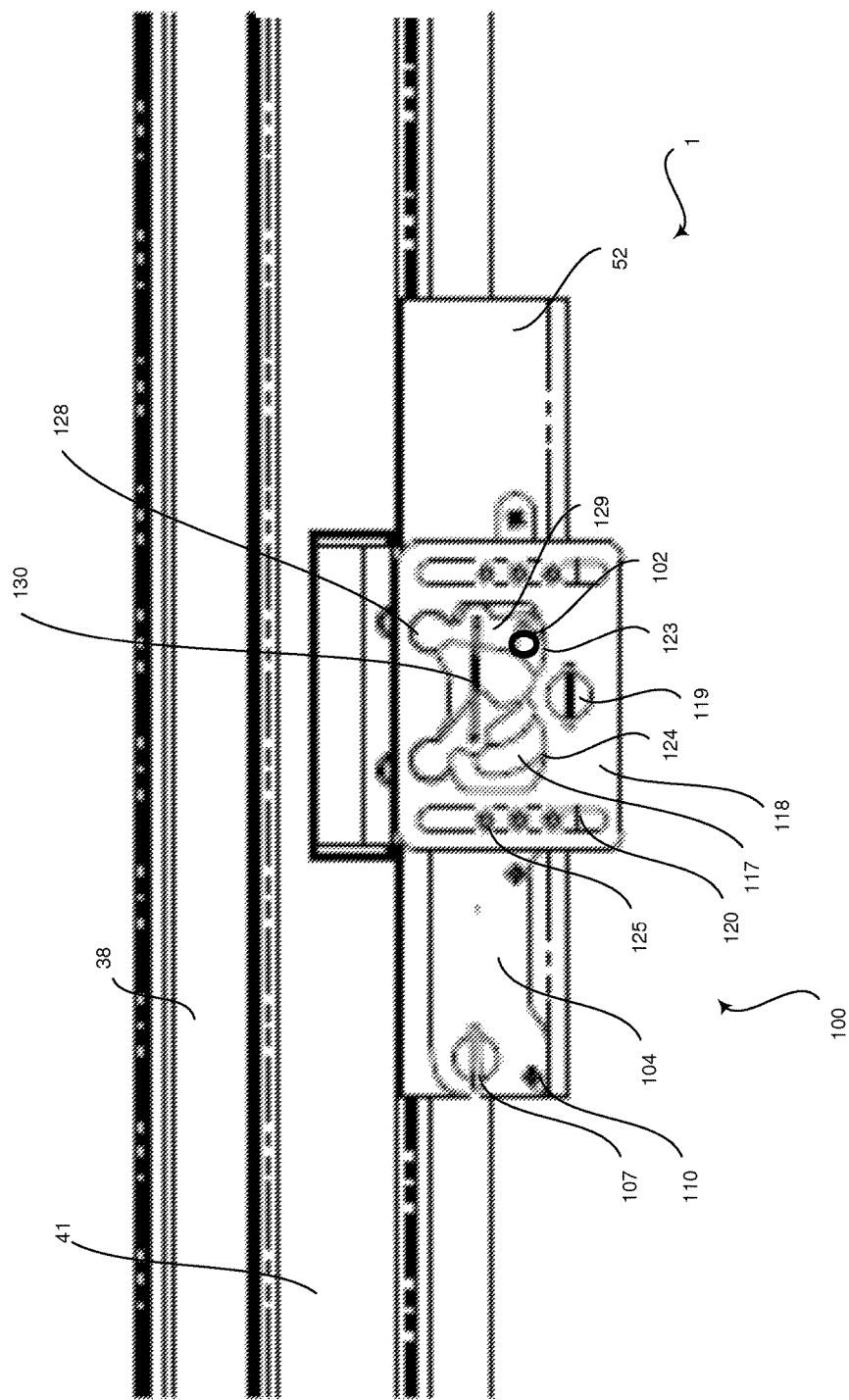
FIG. 4 is a diagram that illustrates a plan view of an exemplary pump handle system connected to an exemplary opening-closing mechanism for a vent sash that is opening, the exemplary pump handle system shown without a handle in accordance with an embodiment of the present invention.
Figure 8:
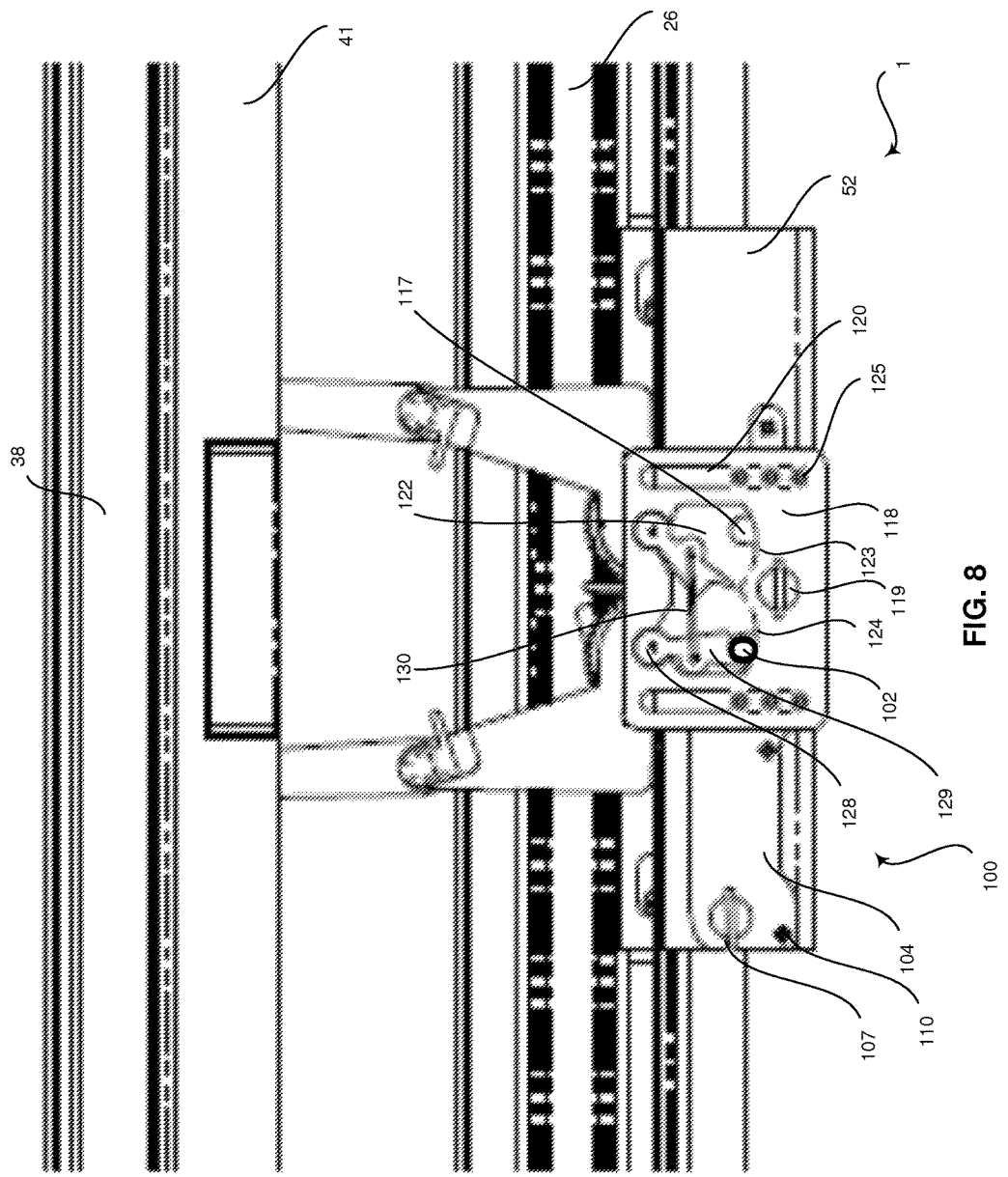
FIG. 8 is a diagram that illustrates a plan view of an exemplary pump handle system connected to an exemplary opening-closing mechanism for a vent sash that is fully open, the exemplary pump handle system shown without a handle in accordance with an embodiment of the present invention.
Figure 12:
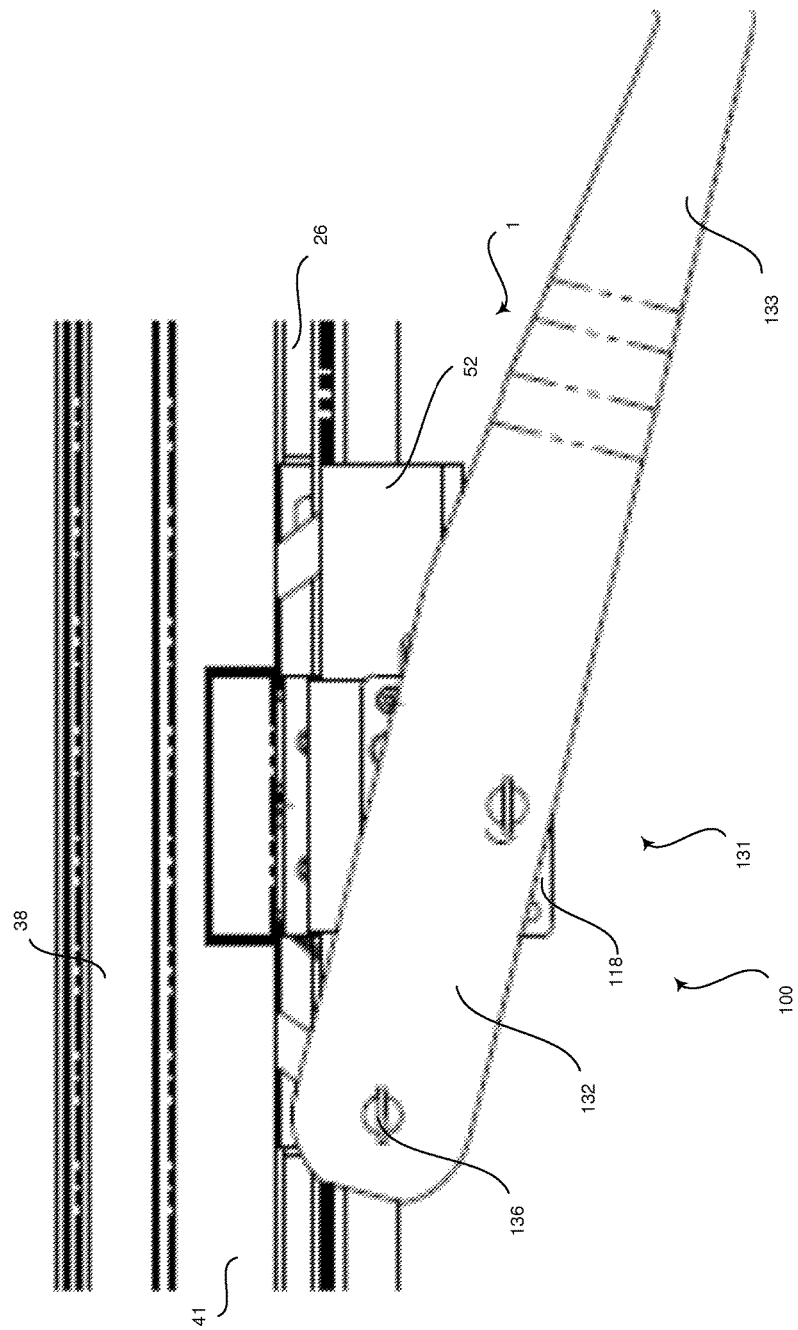
FIG. 12 is a diagram that illustrates a plan view of an exemplary pump handle system connected to an exemplary opening-closing mechanism for a vent sash that is closing, the exemplary pump handle system having a handle that is pivoting out from a starting position to close the vent sash in accordance with an embodiment of the present invention.
Figure 16:
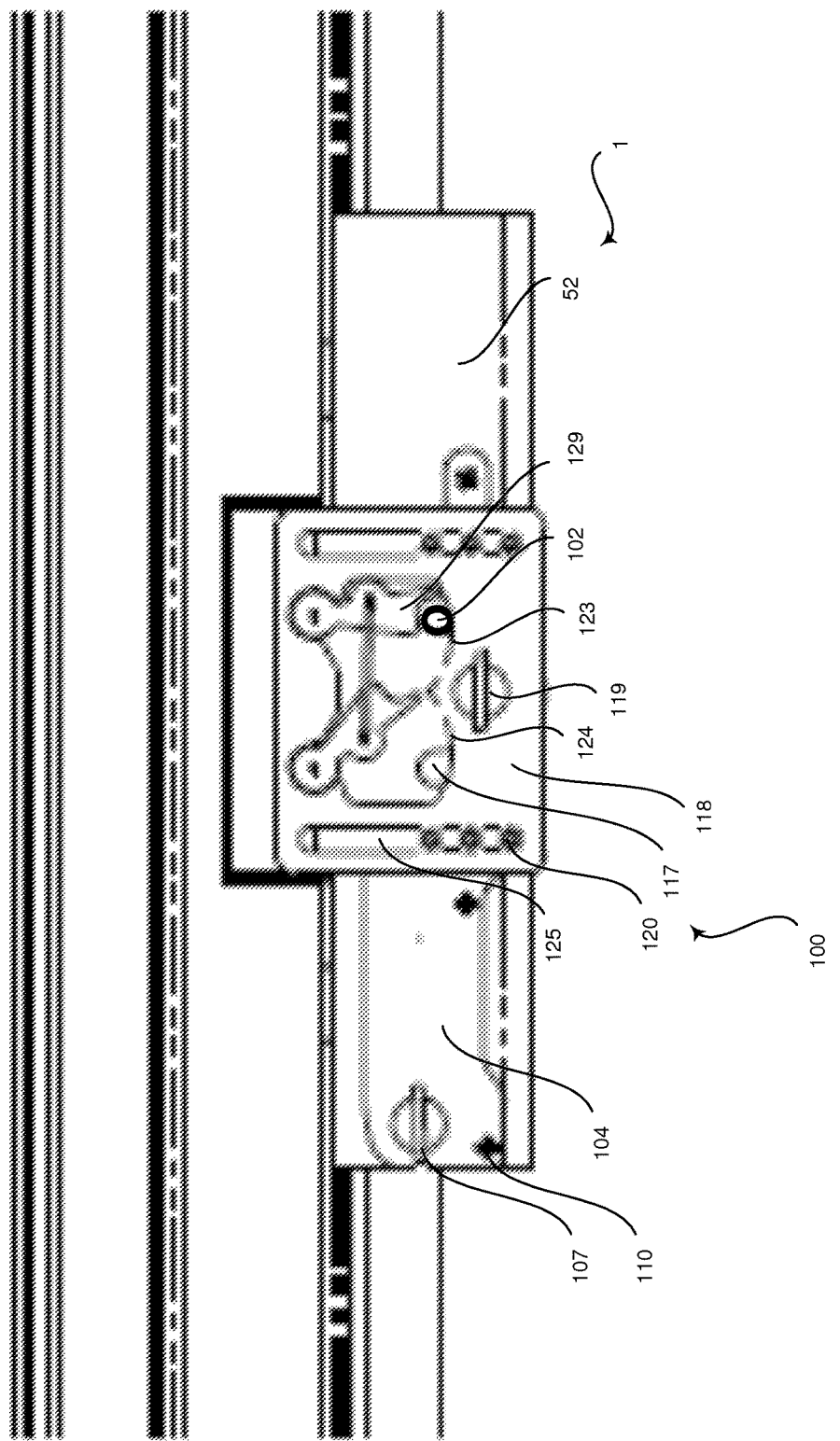
FIG. 16 is a diagram that illustrates a plan view of an exemplary pump handle system connected to an exemplary opening-closing mechanism for a vent sash that is fully closed, the exemplary pump handle system shown without a handle in accordance with an embodiment of the present invention.

FIG. 4 is a diagram that illustrates a plan view of an exemplary pump handle system 100 connected to an exemplary opening-closing mechanism 1 for a vent sash 27 that is opening, the exemplary pump handle system 100 shown without a handle 131. FIG. 8 is a diagram that illustrates a plan view of an exemplary pump handle system 100 connected to an exemplary opening-closing mechanism 1 for a vent sash 27 that is fully open, the exemplary pump handle system 100 shown without a handle 131. FIG. 12 is a diagram that illustrates a plan view of an exemplary pump handle system connected to an exemplary opening-closing mechanism for a vent sash that is closing, the exemplary pump handle system having a handle that is pivoting out from a starting position to close the vent sash in accordance with an embodiment of the present invention. FIG. 16 is a diagram that illustrates a plan view of an exemplary pump handle system connected to an exemplary opening-closing mechanism for a vent sash that is fully closed, the exemplary pump handle system shown without a handle in accordance with an embodiment of the present invention.

Referring to FIGS. 4, 8, 12, and 16, there is shown a pump handle system 100, an opening-closing mechanism 1, and a vent sash 27. The vent sash 27 comprises infill 38 and glazing beading 41. The infill 38 may be glass, aluminum, stone, wood, or any suitable material. The infill 38 may be held in place by glazing beading 41. The opening-closing mechanism 1 is operable to open and close the vent sash 27 and comprises a frame 52 mounted to a window frame 26.

The frame 52 houses and protects components of the opening-closing mechanism 1 while providing an aesthetically-pleasing clean finish.

Still referring to FIGS. 4, 8, 12, and 16, the pump handle system 100 comprises a main frame 104 and a sliding plate 118. The main frame 104 is mounted to the frame 52 of the opening-closing mechanism 1 by mounting screws 110, or any suitable connection mechanism, and comprises a standoff 107 or other suitable connection mechanism for pivotably coupling a pump handle 131 (not shown) to the main frame 104. The sliding plate 118 slidably connects to main frame 104 by shoulder screws 125 that extend through slotted rails 120 of the sliding plate 118. The sliding plate 118 comprises a standoff 119 or other suitable connection mechanism for slidably coupling a pump handle 131 (not shown) to the sliding plate 118.

The sliding plate 118 comprises flippers 127 having a flipper pivot point 128 and a flipper extension 129. The flippers 127 pivot within flipper pivot point slots 121 and a flipper guide opening 122 of the sliding plate 118 as the handle 131 is pivoted and the sliding plate 118 slides. The flipper pivot points 128 rotatably fit within the sliding plate 118 and the flipper extensions 129 of the flippers 127 extend from the flipper pivot points 128 and into the guide opening 122 of the sliding plate 118. The flippers 127 are connected at the flipper extensions 129 by a flipper arm 130 to pivot the flippers 127 in unison as the pump handle 131 is pulled out from a starting position or pushed back to the starting position. The flipper guide opening 122 comprises a first flipper guide edge 123 and a second flipper guide edge 124. The guide edges 123, 124 may be arced edges of the guide opening 122 that correspond with each of the flipper extensions 129 that pivot within the guide opening 122.

As illustrated in FIG. 4, as the vent sash 27 is being unlocked and/or beginning to be opened (i.e., first pull movement of the pump handle 131), the sliding plate 118 slides out linearly in a first direction that is away from the vent sash 27, which forces the flipper extension 129 of a first flipper to drive the pin 102 and rotate the main shaft 109 (not shown) in a first rotational direction. As illustrated in FIG. 8, as the vent sash 27 is being fully opened (i.e., first push movement of the pump handle 131), the sliding plate 118 slides back in a second direction, opposite the first direction, that is toward the vent sash 27. As the sliding plate 118 slides in the second direction, the second flipper guide edge 124 of the sliding plate 118 drives the pin 102 and rotates the main shaft 109 (not shown) in the first rotational direction.

As illustrated in FIG. 12, as the vent sash 27 is beginning to be closed (i.e., second pull movement of the pump handle 131), the sliding plate 118 slides out linearly in the first direction that is away from the vent sash 27, which forces the flipper extension 129 of a second flipper to drive the pin 102 and rotate the main shaft 109 (not shown) in a second rotational direction that is opposite the first rotational direction. As illustrated in FIG. 16, as the vent sash 27 is being fully closed and/or locked (i.e., second push movement of the pump handle 131), the sliding plate 118 slides back in the second direction, opposite the first direction, that is toward the vent sash 27. As the sliding plate 118 slides in the second direction, the first flipper guide edge 123 of the sliding plate 118 drives the pin 102 and rotates the main shaft 109 (not shown) in the second rotational direction.

The pump handle system 100 illustrated in FIGS. 4, 8, 12, and 16 shares various characteristics with the pump handle system 100 illustrated in FIGS. 1-3, 6-7, 10-11, and 14-15 as described above.

Figure 5:
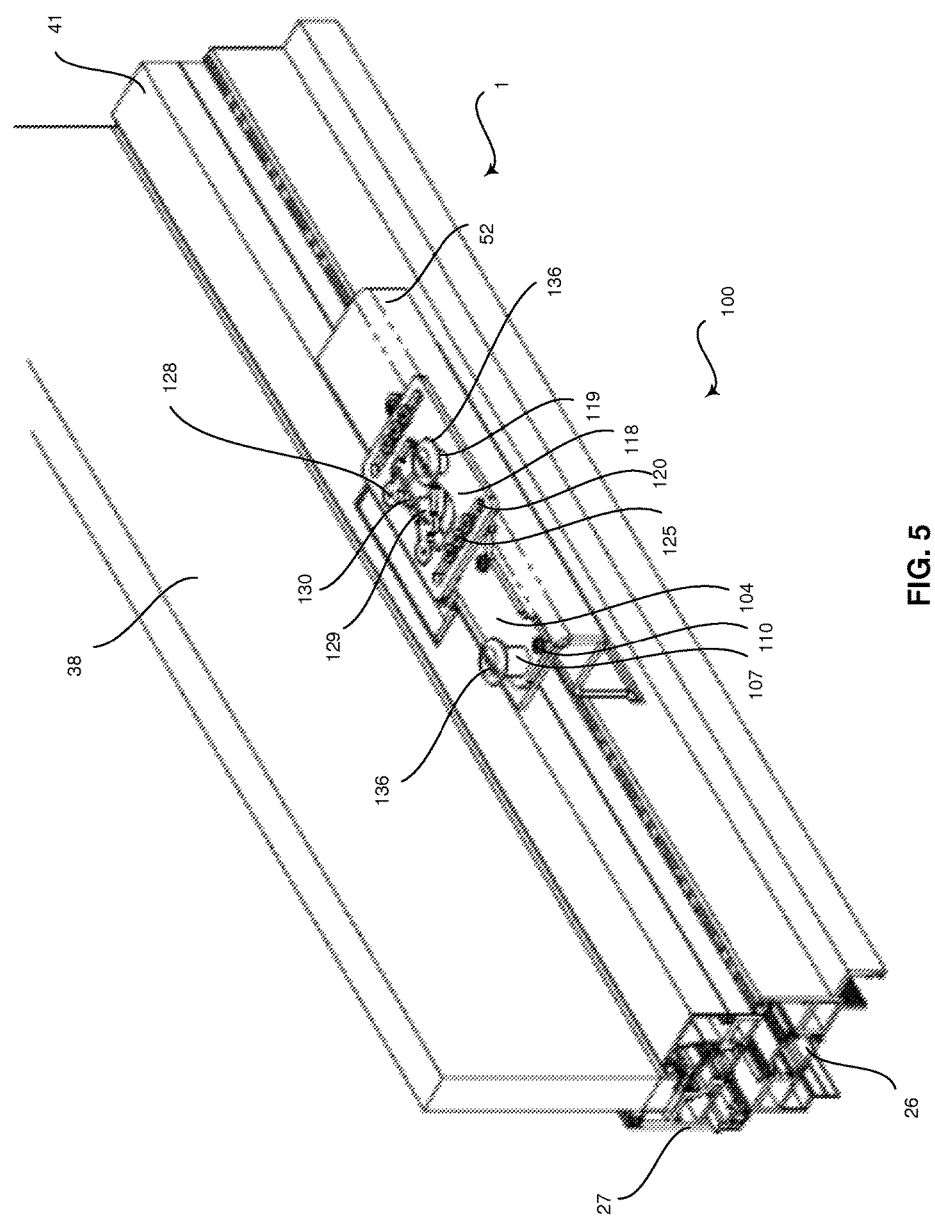
FIG. 5 is a diagram that illustrates a perspective view of an exemplary pump handle system connected to an exemplary opening-closing mechanism for a vent sash that is opening, the exemplary pump handle system shown without a handle in accordance with an embodiment of the present invention.
Figure 9:
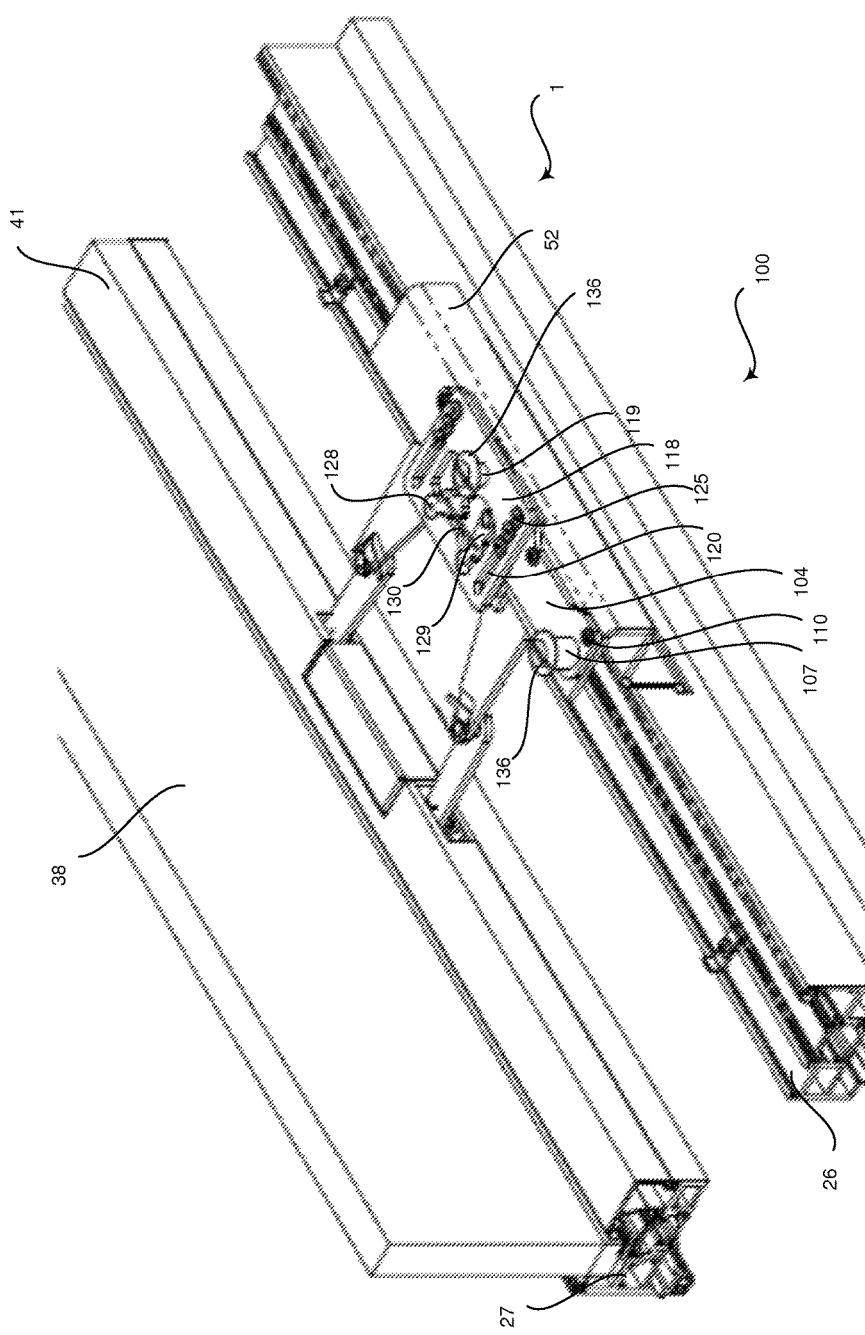
FIG. 9 is a diagram that illustrates a perspective view of an exemplary pump handle system connected to an exemplary opening-closing mechanism for a vent sash that is fully open, the exemplary pump handle system shown without a handle in accordance with an embodiment of the present invention.
Figure 13:
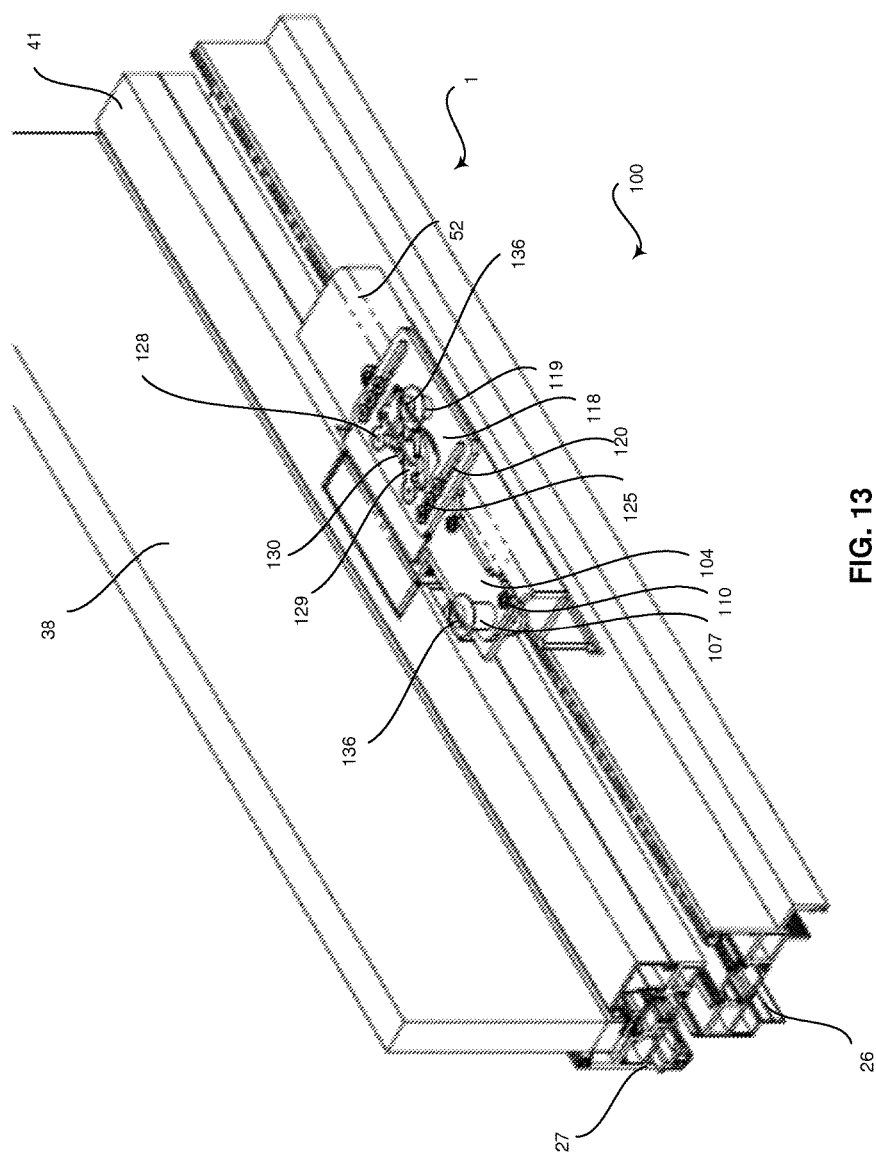
FIG. 13 is a diagram that illustrates a perspective view of an exemplary pump handle system connected to an exemplary opening-closing mechanism for a vent sash that is closing, the exemplary pump handle system shown without a handle in accordance with an embodiment of the present invention.
Figure 17:
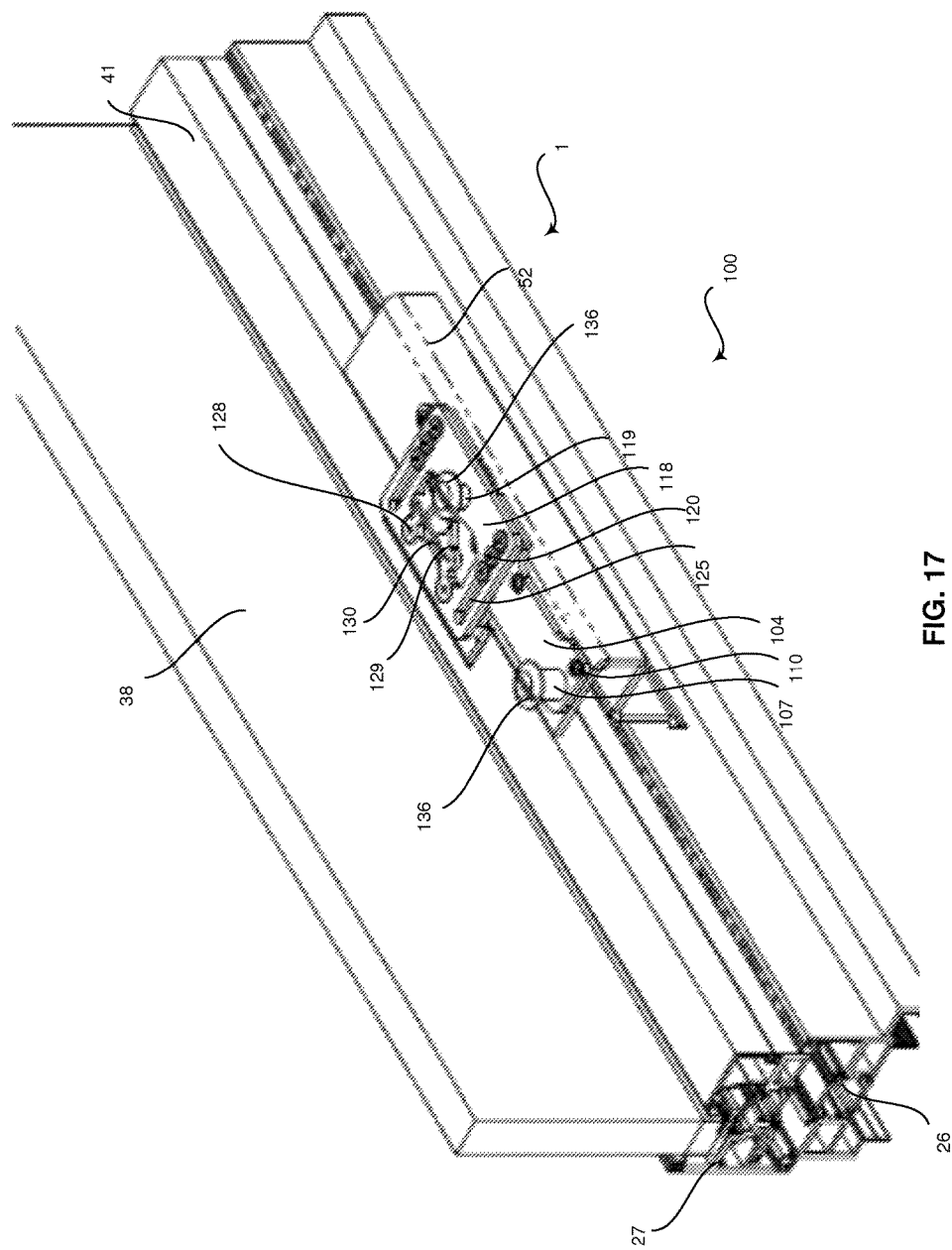
FIG. 17 is a diagram that illustrates a perspective view of an exemplary pump handle system connected to an exemplary opening-closing mechanism for a vent sash that is fully closed, the exemplary pump handle system shown without a handle in accordance with an embodiment of the present invention.

FIG. 5 is a diagram that illustrates a perspective view of an exemplary pump handle system 100 connected to an exemplary opening-closing mechanism for a vent sash 27 that is opening, the exemplary pump handle system 100 shown without a handle 131. FIG. 9 is a diagram that illustrates a perspective view of an exemplary pump handle system 100 connected to an exemplary opening-closing mechanism 1 for a vent sash 27 that is fully open, the exemplary pump handle system 100 shown without a handle 131. FIG. 13 is a diagram that illustrates a perspective view of an exemplary pump handle system 100 connected to an exemplary opening-closing mechanism 1 for a vent sash 27 that is closing, the exemplary pump handle system 100 shown without a handle 131. FIG. 17 is a diagram that illustrates a perspective view of an exemplary pump handle system 100 connected to an exemplary opening-closing mechanism 1 for a vent sash 27 that is fully closed, the exemplary pump handle system 100 shown without a handle 131.

Referring to FIGS. 5, 9, 13, and 17, there is shown a pump handle system 100, an opening-closing mechanism 1, a window frame 26, and a vent sash 27. The vent sash 27 comprises infill 38 and glazing beading 41. The infill 38 may be glass, aluminum, stone, wood, or any suitable material. The infill 38 may be held in place by glazing beading 41. The opening-closing mechanism 1 is operable to open and close the vent sash 27 and comprises a frame 52 mounted to a window frame 26. The frame 52 houses and protects components of the opening-closing mechanism 1 while providing an aesthetically-pleasing clean finish.

Still referring to FIGS. 5, 9, 13, and 17, the pump handle system 100 comprises a main frame 104 and a sliding plate 118. The main frame 104 is mounted to the frame 52 of the opening-closing mechanism 1 by mounting screws 110, or any suitable connection mechanism, and comprises a standoff 107 or other suitable connection mechanism for pivotably coupling a pump handle 131 (not shown) to the main frame 104. The sliding plate 118 slidably connects to main frame 104 by shoulder screws 125 that extend through slotted rails 120 of the sliding plate 118. The sliding plate 118 comprises a standoff 119 or other suitable connection mechanism for slidably coupling a pump handle 131 (not shown) to the sliding plate 118.

The sliding plate 118 comprises flippers 127 having a flipper pivot point 128 and a flipper extension 129. The flippers 127 pivot within flipper pivot point slots 121 and a flipper guide opening 122 of the sliding plate 118 as the handle 131 is pivoted and the sliding plate 118 slides. The flipper pivot points 128 rotatably fit within the sliding plate 118 and the flipper extensions 129 of the flippers 127 extend from the flipper pivot points 128 and into the guide opening 122 of the sliding plate 118. The flippers 127 are connected at the flipper extensions 129 by a flipper arm 130 to pivot the flippers 127 in unison as the pump handle 131 is pulled out from a starting position or pushed back to the starting position. The flipper guide opening 122 comprises a first flipper guide edge 123 and a second flipper guide edge 124. The guide edges 123, 124 may be curved edges of the guide opening 122 configured to drive a pin 102 when the sliding plate 118 is forced toward the vent sash 27 (i.e., first and second push movements).

As illustrated in FIG. 5, as the vent sash 27 is being unlocked and/or beginning to be opened (i.e., first pull movement of the pump handle 131), the sliding plate 118 slides out linearly in a first direction that is away from the vent sash 27. As illustrated in FIG. 8, as the vent sash 27 is being fully opened (i.e., first push movement of the pump handle 131), the sliding plate 118 slides back in a second direction, opposite the first direction, that is toward the vent sash 27. As illustrated in FIG. 12, as the vent sash 27 is beginning to be closed (i.e., second pull movement of the pump handle 131), the sliding plate 118 slides out linearly in the first direction that is away from the vent sash 27. As illustrated in FIG. 16, as the vent sash 27 is being fully closed and/or locked (i.e., second push movement of the pump handle 131), the sliding plate 118 slides back in the second direction, opposite the first direction, that is toward the vent sash 27. The pump handle system 100 illustrated in FIGS. 5, 9, 13, and 17 shares various characteristics with the pump handle system 100 illustrated in FIGS. 1-4, 6-8, 10-12, and 14-16 as described above.

Although FIGS. 1-17 illustrate the pump handle 131 extending in a first direction (e.g., to the right), in certain embodiments the pump handle system 100 may be configured to extend in a different direction, such as the left, up, or down by reconfiguring and/or rotating components of the pump handle system 100, and/or by adjusting the mounting position of the pump handle system 100, for example.

Figure 18:
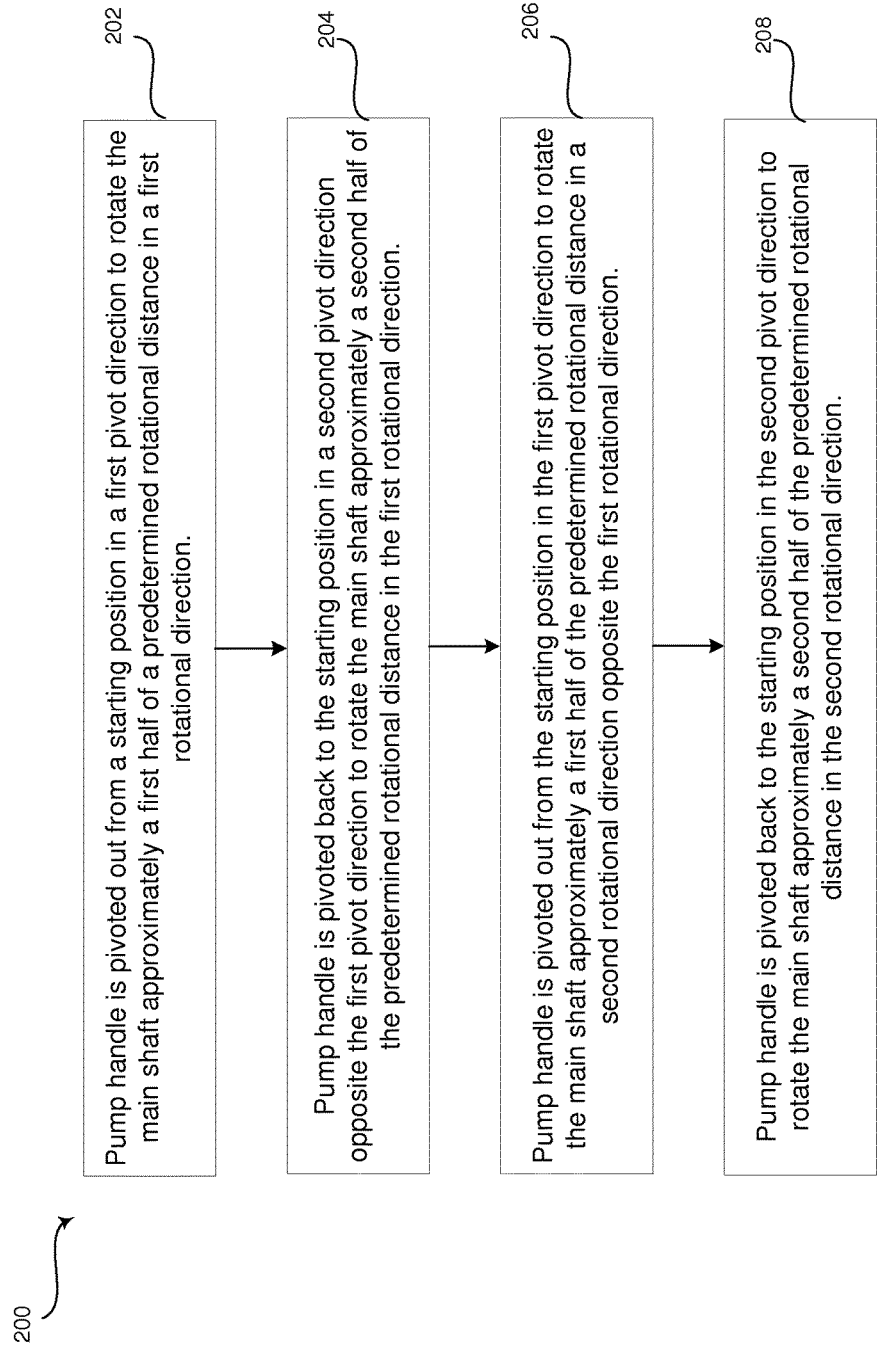
FIG. 18 is a flow diagram that illustrates exemplary steps for rotating a main shaft a predetermined rotational distance in first and second rotational directions in accordance with an embodiment of the present invention.

FIG. 18 is a flow diagram 200 that illustrates exemplary steps 202-208 for rotating a main shaft 109 a predetermined rotational distance in first and second rotational directions in accordance with an embodiment of the present invention. Referring to FIG. 18, there is shown a flow diagram 200, which illustrates exemplary steps for rotating a main shaft 109 a predetermined rotational distance in first and second rotational directions. At step 202, a pump handle 131 is pivoted out from a starting position in a first pivot direction to rotate the main shaft 109 approximately a first half of a predetermined rotational distance in a first rotational direction. At step 204, the pump handle 131 is pivoted back to the starting position in a second pivot direction opposite the first pivot direction to rotate the main shaft 109 approximately a second half of the predetermined rotational distance in the first rotational direction. At step 206, the pump handle 131 is pivoted out from the starting position in the first pivot direction to rotate the main shaft 109 approximately a first half of the predetermined rotational distance in a second rotational direction opposite the first rotational direction. At step 208, the pump handle 131 is pivoted back to the starting position in the second pivot direction to rotate the main shaft 109 approximately a second half of the predetermined rotational distance in the second rotational direction. Although the method is described with reference to the exemplary elements of the systems described above, it should be understood that other implementations are possible.

At step 202, a pump handle 131 is pivoted out from a starting position in a first pivot direction to rotate the main shaft 109 approximately a first half of a predetermined rotational distance in a first rotational direction. For example, the pump handle 131 may be radially pivoted approximately fifteen (15) degrees (i.e., 5-30 degrees) by grasping the handle portion 133 and pulling the handle portion 133 away from a vent sash 27 or other device such that the pump handle 131 pivots at a pivot point 134 of the base portion 132. This is a first pull movement of a two-movement pull-push motion of the pump handle 131 for rotating the main shaft 109 a predetermined rotational distance in a first rotational direction. In various embodiments, the predetermined rotational distance may correspond with one hundred and eighty (180) degrees, for example, and the approximately a first half of the predetermined distance is 85-105 degrees.

In various embodiments, as the pump handle 131 is pulled from a starting position away from the vent sash 27 or other device, the sliding plate 118 slides linearly in a first direction that is away from the vent sash 27. As the sliding plate 118 is driven in the first direction, the sliding plate 118 forces a first flipper 127 to drive a pin 102 of the drive disk 101 just beyond the point in the flipper guide opening 122 where the first flipper guide edge 123 meets the second flipper guide edge 124. The drive disk 101, guide disk 111, and main shaft 109 rotate in unison as the flipper 127 drives and follows the pin 102 approximately a first half (e.g., 85-105 degrees) of the predetermined distance (e.g., 180 degrees) in the first rotational direction. Aspects of the present invention provide that the rotation of the main shaft 109 caused by the first pull movement may, for example, drive the opening-closing mechanism 1 to unlock and/or begin opening the vent sash 27, a door, or any suitable device.

At step 204, the pump handle 131 is pivoted back to the starting position in a second pivot direction opposite the first pivot direction to rotate the main shaft 109 approximately a second half of the predetermined rotational distance in the first rotational direction. For example, the pump handle 131 may be radially pivoted back the approximately fifteen (15) degrees (i.e., 5-30 degrees) to the starting position by grasping the handle portion 133 and pushing the handle portion 133 toward a vent sash 27 or other device. This is a first push movement of a two-movement pull-push motion of the pump handle 131 for rotating the main shaft 109 the predetermined rotational distance in the first rotational direction. In various embodiments, the predetermined rotational distance may correspond with one hundred and eighty (180) degrees, for example, and the approximately a second half of the predetermined distance is 75-95 degrees.

In various embodiments, as the pump handle 131 is pushed back to the starting position toward the vent sash 27 or other device, the sliding plate 118 slides linearly in a second direction, opposite the first direction, that is toward the vent sash 27. As the sliding plate 118 is driven in the second direction, the second flipper guide edge 124 of the sliding plate 118 drives the pin 102 of the drive disk 101 in the first rotational direction for the remaining approximately half (e.g., 75-95 degrees) of the predetermined distance (e.g., 180 degrees). The drive disk 101, guide disk 111, and main shaft 109 rotate in unison in the first rotational direction as the second flipper guide edge 124 drives the pin 102. In certain embodiments, the rotation of the main shaft 109 caused by the first push movement may, for example, drive the opening-closing mechanism 1 to fully open the vent sash 27, a door, or any suitable device.

At step 206, the pump handle 131 is pivoted out from the starting position in the first pivot direction to rotate the main shaft 109 approximately a first half of the predetermined rotational distance in a second rotational direction opposite the first rotational direction. For example, the pump handle 131 may be radially pivoted approximately fifteen (15) degrees (i.e., 5-30 degrees) by grasping the handle portion 133 and pulling the handle portion 133 away from a vent sash 27 or other device such that the pump handle 131 pivots at a pivot point 134 of the base portion 132. This is a second pull movement of a two-movement pull-push motion of the pump handle 131 for rotating the main shaft 109 a predetermined rotational distance in a second rotational direction. Note that the first time the pump handle 131 is pulled (step 202) and pushed (step 204), the main shaft 109 rotates in a first rotational direction, whereas the next time the pump handle 131 is pulled (step 206) and pushed (step 208), the main shaft 109 rotates in a second rotational direction opposite from the first rotational direction. In various embodiments, the predetermined rotational distance may correspond with one hundred and eighty (180) degrees, for example, and the approximately a first half of the predetermined distance is 85-105 degrees.

In various embodiments, as the pump handle 131 is pulled from a starting position away from the vent sash 27 or other device, the sliding plate 118 slides linearly in the first direction that is away from the vent sash 27. As the sliding plate 118 is driven in the first direction, the sliding plate 118 forces a second flipper 127 to drive pin 102 of the drive disk 101 just beyond the point in the flipper guide opening 122 where the second flipper guide edge 124 meets the first flipper guide edge 123. The drive disk 101, guide disk 111, and main shaft 109 rotate in unison as the flipper 127 drives and follows the pin 102 approximately a first half (e.g., 85-105 degrees) of the predetermined distance (e.g., 180 degrees) in the second rotational direction that is opposite the first rotational direction of the first pull-push movement. In certain embodiments, the rotation of the main shaft 109 caused by the second pull movement may, for example, drive the opening-closing mechanism 1 to begin closing the vent sash 27, a door, or any suitable device.

At step 208, the pump handle 131 is pivoted back to the starting position in the second pivot direction to rotate the main shaft 109 approximately a second half of the predetermined rotational distance in the second rotational direction. For example, the pump handle 131 may be radially pivoted back the approximately fifteen (15) degrees (i.e., 5-30 degrees) to the starting position by grasping the handle portion 133 and pushing the handle portion 133 toward a vent sash 27 or other device. This is a second push movement of a two-movement pull-push motion of the pump handle 131 for rotating the main shaft 109 the predetermined rotational distance in the second rotational direction. In various embodiments, the predetermined rotational distance may correspond with one hundred and eighty (180) degrees, for example, and the approximately a second half of the predetermined distance is 75-95 degrees.

In various embodiments, as the pump handle 131 is pushed back to the starting position toward the vent sash 27 or other device, the sliding plate 118 slides linearly in the second direction, opposite the first direction, that is toward the vent sash 27. As the sliding plate 118 is driven in the second direction, the second flipper guide edge 124 of the sliding plate 118 drives the pin 102 of the drive disk 101 in the second rotational direction for the remaining approximately half (e.g., 75-95 degrees) of the predetermined distance (e.g., 180 degrees). The drive disk 101, guide disk 111, and main shaft 109 rotate in unison in the second rotational direction as the first flipper guide edge 123 drives the pin 102. In certain embodiments, the rotation of the main shaft 109 caused by the second push movement may, for example, drive the opening-closing mechanism 1 to fully close and/or lock the vent sash 27, a door, or any suitable device.

Aspects of the present invention provide that the pump handle 131 may be pivoted approximately fifteen (15) degrees (i.e., 5-30 degrees) for each full pull and push movement. Accordingly, the pump handle 131 reduces the amount of operational space needed to unlock, open, close, and lock a vent sash 27 or other device such that the pump handle 131 can be operated in confined spaces. Moreover, the limited amount of space needed to operate the pump handle 131 allows the length of the pump handle 131 to be extended to reduce the amount of force needed to operate the pump handle 131 such that it does not exceed five (5) pounds (lbs.), irrespective of the size and weight of the vent sash 27, and to ensure that the operating point of the pump handle meets the height requirements of the ADA accessibility guidelines. Also, pivoting the pump handle 131 approximately fifteen (15) degrees (i.e., 5-30 degrees) for each full pull and push movement does not involve excessive twisting or turning of an operator's wrist.

As used in the present application, the term "approximately 15 degrees" refers to a range of between 5 and 30 degrees of pump handle rotation. The term "approximately a first half of the predetermined distance" refers to a range between 85 and 105 degrees of main shaft 109 rotation when the predetermined distance is one hundred and eighty (180) degrees and other corresponding ranges for different predetermined distances. The term "approximately a second half of the predetermined distance" refers to a range between 75 and 95 degrees of main shaft 109 rotation when the predetermined distance is one hundred and eighty (180) degrees and other corresponding ranges for different predetermined distances. The sum of the "approximately a first half of the predetermined distance" and the "approximately a second half of the predetermined distance" equals the "predetermined distance."

Various embodiments provide that the pump handle system 100 may be retrofitted to replace an existing handle of an opening-closing mechanism 1 such that the pump handle system 100 operates with an existing opening-closing mechanism 1 of a vent sash 27, a door, or the like. Additionally and/or alternatively, the pump handle system 100 may be manufactured as a part of an opening-closing mechanism 1 of a vent sash 27, a door, or the like. Additionally and/or alternatively, the pump handle system 100 and opening-closing mechanism 1 may be manufactured to be integrated within a window frame 26 and attached to a locking mechanism of a vent sash 27, among other things.

Aspects of the present invention provide a pump handle system 100 comprising a pump handle 131 and a main shaft 109. The pump handle 131 comprises a base portion 132 and a handle portion 133. The pump handle 131 is operable to radially pivot at a pivot point 134 in the base portion 132 from a starting position in a first pivot direction and back to the starting position in a second pivot direction opposite the first pivot direction. The main shaft 109 is driven by the pump handle 131 to (1) rotate approximately a first half of a predetermined rotational distance in a first rotational direction a first time the pump handle 131 is pivoted out from the starting position in the first pivot direction, (2) rotate approximately a second half of the predetermined rotational distance in the first rotational direction a first time the pump handle 131 is pivoted back to the starting position in the second pivot direction, (3) rotate approximately the first half of the predetermined rotational distance in a second rotational direction opposite the first rotational direction a second time the pump handle 131 is pivoted out from the starting position in the first pivot direction, and (4) rotate approximately the second half of the predetermined rotational distance in the second rotational direction a second time the pump handle 131 is pivoted back to the starting position in the second pivot direction.

In a representative embodiment, the pump handle system 100 comprises a main frame 104 pivotably coupled with the base portion 132 of the pump handle 131 at the pivot point 134. In various embodiments, the pump handle system 100 comprises a sliding plate 118 slidably coupled to the main frame 104 and the base portion 132 of the pump handle 131. In certain embodiments, the sliding plate 118 comprises slotted rails 120 at opposite ends of the sliding plate 118. The sliding plate 118 slidably couples to the main frame 104 by a connection mechanism 125 extending through the slotted rails 120 and attaching to the main frame 104. The sliding plate 118 slides linearly at the slotted rails 120. In a representative embodiment, the sliding plate 118 slides linearly in a first sliding direction as the pump handle 131 pivots in the first pivot direction. The sliding plate 118 slides linearly in a second sliding direction opposite the first sliding direction as the pump handle 131 pivots in the second pivot direction.

In various embodiments, the pump handle system 100 comprises a drive disk 101 and a guide disk 111. The drive disk 101 comprises a pin 102. The drive disk 101 rotatably fits within a drive disk opening 108 in the main frame 104. The main shaft 109 extends through the drive disk 101. The guide disk 111 comprises a pin hole 112 and a main shaft head hole 114. The pin 102 of the drive disk 101 extends through the pin hole 112 of the guide disk 111. The main shaft head hole 114 fits on a head of the main shaft 109 such that the drive disk 101, guide disk 111, and main shaft 109 rotate in unison. The pin 102 of the drive disk 101 extends into a flipper guide opening 122 of the sliding plate 118. In certain embodiments, the sliding plate 118 comprises flippers 127 operable to pivot in unison within the flipper guide opening 122 of the sliding plate 118 as the pump handle 131 pivots and one of the flippers 127 one or more of drives and follows the pin 102. In a representative embodiment, the flippers 127 are joined by a flipper arm 130 to pivot the flippers 127 in unison.

In certain embodiments, the main frame 104 is configured to mount to an opening-closing mechanism 1 of a device. In various embodiments, the device is a vent sash 27. In a representative embodiment, the handle portion 133 of the pump handle 131 is at least one of telescopic, collapsible, and foldable. In certain embodiments, the predetermined rotational distance is one hundred and eighty (180) degrees. In various embodiments, the first half of the predetermined rotational distance corresponds with between eighty-five (85) degrees and one hundred and five (105) degrees. In a representative embodiment, the second half of the predetermined rotational distance corresponds with between seventy-five (75) degrees and ninety-five (95) degrees.

Various embodiments provide a method 200 for rotating a main shaft 109 a predetermined rotational distance in a first rotational direction and in a second rotational direction. The method 200 comprises pivoting out a pump handle 131 from a starting position in a first pivot direction to rotate the main shaft 109 approximately a first half of a predetermined rotational distance in a first rotational direction 202. The method 200 comprises pivoting back the pump handle 131 to the starting position in a second pivot direction opposite the first pivot direction to rotate the main shaft 109 approximately a second half of the predetermined rotational distance in the first rotational direction 204. The method 200 comprises pivoting out the pump handle 131 from the starting position in the first pivot direction to rotate the main shaft 109 approximately the first half of the predetermined rotational distance in a second rotational direction opposite the first rotational direction 206. The method 200 comprises pivoting back the pump handle 131 to the starting position in the second pivot direction to rotate the main shaft 109 approximately the second half of the predetermined rotational distance in the second rotational direction 208.

In a representative embodiment, the main pivot 109 drives an opening-closing mechanism 1 of a device. In certain embodiments, the device is a vent sash 27. In various embodiments, the predetermined rotational distance is one hundred and eighty (180) degrees. In a representative embodiment, the first half of the predetermined rotational distance corresponds with between eighty-five (85) degrees and one hundred and five (105) degrees. In certain embodiments, the second half of the predetermined rotational distance corresponds with between seventy-five (75) degrees and ninety-five (95) degrees Although devices, methods, and systems according to the present invention may have been described in connection with a preferred embodiment, it is not intended to be limited to the specific form set forth herein, but on the contrary, it is intended to cover such alternative, modifications, and equivalents, as can be reasonably included within the scope of the invention as defined by this disclosure and appended diagrams.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A pump handle system comprising:
   a pump handle comprising a base portion and a handle portion, the pump handle operable to radially pivot at a pivot point in the base portion from a starting position in a first pivot direction and back to the starting position in a second pivot direction opposite the first pivot direction; and
   a main shaft driven by the pump handle, the main shaft configured to:
      rotate approximately a first half of a predetermined rotational distance in a first rotational direction a first time the pump handle is pivoted out from the starting position in the first pivot direction,
      rotate approximately a second half of the predetermined rotational distance in the first rotational direction a first time the pump handle is pivoted back to the starting position in the second pivot direction,
      rotate approximately the first half of the predetermined rotational distance in a second rotational direction opposite the first rotational direction a second time the pump handle is pivoted out from the starting position in the first pivot direction, and
      rotate approximately the second half of the predetermined rotational distance in the second rotational direction a second time the pump handle is pivoted back to the starting position in the second pivot direction.

2. The pump handle system according to claim 1, further comprising a main frame pivotably coupled with the base portion of the pump handle at the pivot point.

3. The pump handle system according to claim 2, further comprising a sliding plate slidably coupled to the main frame and the base portion of the pump handle.

4. The pump handle system according to claim 3, wherein the sliding plate comprises slotted rails at opposite ends of the sliding plate, the sliding plate slidably coupled to the main frame by a connection mechanism extending through the slotted rails and attaching to the main frame, and wherein the sliding plate slides linearly at the slotted rails.

5. The pump handle system according to claim 3, wherein the sliding plate slides linearly in a first sliding direction as the pump handle pivots in the first pivot direction, and wherein the sliding plate slides linearly in a second sliding direction opposite the first sliding direction as the pump handle pivots in the second pivot direction.

6. The pump handle system according to claim 5, further comprising:
   a drive disk comprising a pin, wherein the drive disk rotatably fits within a drive disk opening in the main frame, and wherein the main shaft extends through the drive disk; and
   a guide disk comprising a pin hole and a main shaft head hole, wherein the pin of the drive disk extends through the pin hole of the guide disk, and wherein the main shaft head hole fits on a head of the main shaft such that the drive disk, guide disk, and main shaft rotate in unison,
   wherein the pin of the drive disk extends into a flipper guide opening of the sliding plate.

7. The pump handle system according to claim 6, wherein the sliding plate comprises flippers operable to pivot in unison within the flipper guide opening of the sliding plate as the pump handle pivots and one of the flippers one or more of drives and follows the pin.

8. The pump handle system according to claim 7, wherein the flippers are joined by a flipper arm to pivot the flippers in unison.

9. The pump handle system according to claim 2, wherein the main frame is configured to mount to an opening-closing mechanism of a device.

10. The pump handle system according to claim 9, wherein the device is a vent sash.

11. The pump handle system according to claim 1, wherein the handle portion of the pump handle is at least one of telescopic, collapsible, and foldable.

12. The pump handle system according to claim 1, wherein the predetermined rotational distance is one hundred and eighty (180) degrees.

13. The pump handle system according to claim 12, wherein the first half of the predetermined rotational distance corresponds with between eighty-five (85) degrees and one hundred and five (105) degrees.

14. The pump handle system according to claim 13, wherein the second half of the predetermined rotational distance corresponds with between seventy-five (75) degrees and ninety-five (95) degrees.

15. A method for rotating a main shaft a predetermined rotational distance in a first rotational direction and in a second rotational direction, where the main shaft is driven by a pump handle comprising a base portion and a handle portion, the pump handle operable to radially pivot at a pivot in the base portion from a starting position in a first pivot direction and a back to the starting position in a second pivot direction opposite the first pivot direction, the method comprising:
   pivoting out the pump handle from the starting position in the first pivot direction a first time to rotate the main shaft approximately a first half of the predetermined rotational distance in the first rotational direction;
   pivoting back the pump handle to the starting position in the second pivot direction a first time to rotate the main shaft approximately a second half of the predetermined rotational distance in the first rotational direction;
   pivoting out the pump handle from the starting position in the first pivot direction a second time to rotate the main shaft approximately the first half of the predetermined rotational distance in the second rotational direction opposite the first rotational direction; and
   pivoting back the pump handle to the starting position in the second pivot direction a second time to rotate the main shaft approximately the second half of the predetermined rotational distance in the second rotational direction.

16. The method of claim 15, wherein the main pivot drives an opening-closing mechanism of a device.

17. The method of claim 16, wherein the device is a vent sash.

18. The method of claim 15, wherein the predetermined rotational distance is one hundred and eighty (180) degrees.

19. The method of claim 18, wherein the first half of the predetermined rotational distance corresponds with between eighty-five (85) degrees and one hundred and five (105) degrees.

20. The method of claim 19, wherein the second half of the predetermined rotational distance corresponds with between seventy-five (75) degrees and ninety-five (95) degrees.

* * * * *